US009298293B2

(12) United States Patent
Satou

(10) Patent No.: US 9,298,293 B2
(45) Date of Patent: Mar. 29, 2016

(54) PORTABLE ELECTRONIC APPARATUS

(71) Applicant: PANASONIC INTELLECTUAL PROPERTY CORPORATION OF AMERICA, Torrance, CA (US)

(72) Inventor: Mitsuru Satou, Kanagawa (JP)

(73) Assignee: PANASONIC INTELLECTUAL PROPERTY CORPORATION OF AMERICA, Torrance, CA (US)

(*) Notice: Subject to any disclaimer, the term of this patent is extended or adjusted under 35 U.S.C. 154(b) by 13 days.

(21) Appl. No.: 14/483,738

(22) Filed: Sep. 11, 2014

(65) Prior Publication Data

US 2015/0042910 A1   Feb. 12, 2015

Related U.S. Application Data

(63) Continuation of application No. 14/235,153, filed as application No. PCT/JP2013/002628 on Apr. 18, 2013, now Pat. No. 9,002,419.

(30) Foreign Application Priority Data

Apr. 19, 2012  (JP) ................. 2012-095879
Sep. 14, 2012  (JP) ................. 2012-202988
Jan. 25, 2013  (JP) ................. 2013-012483

(51) Int. Cl.
*G06F 3/041*  (2006.01)
*G06F 3/044*  (2006.01)
*G06F 1/16*   (2006.01)

(52) U.S. Cl.
CPC .............. *G06F 3/041* (2013.01); *G06F 1/1626* (2013.01); *G06F 1/1643* (2013.01); *G06F 3/044* (2013.01)

(58) Field of Classification Search
CPC .................................. G06F 3/044; G06F 3/041
USPC ........... 455/575.1, 90.3, 128, 575.5; 361/816, 361/818, 679.01, 679.02, 679.21, 679.26, 361/679.3
See application file for complete search history.

(56) References Cited

U.S. PATENT DOCUMENTS

2002/0149561 A1   10/2002 Fukumoto et al.
2003/0223024 A1   12/2003 Ogawa
(Continued)

FOREIGN PATENT DOCUMENTS

JP    11-272789    10/1999
JP    2002-149312   5/2002
(Continued)

OTHER PUBLICATIONS

International Search Report and Written Opinion in PCT/JP2013/002628, mail date is Jul. 9, 2013, together with an English language translation of ISR.
(Continued)

*Primary Examiner* — Dwayne Bost
*Assistant Examiner* — Christopher Kohlman
(74) *Attorney, Agent, or Firm* — Greenblum & Bernstein, P.L.C.

(57) ABSTRACT

A portable electronic apparatus includes a housing having a first face and first and second side faces, the first and second side faces rising from the first face, and at least a concave portion is configured by the first side face, the first face and the second side face; a display, at least a part of the display being accommodated in the concave portion; a touch panel that is positioned on the display and is capable of detecting at least a distance to an indicator; first and second sheet metal members respectively disposed on the first and second side faces, at least a part of the first and second sheet metal members facing a side face of the display; a third sheet metal member disposed on the first face; and a cover glass that covers at least the display, the first sheet metal member, and the second sheet metal member.

4 Claims, 27 Drawing Sheets

(56) References Cited

U.S. PATENT DOCUMENTS

| | | |
|---|---|---|
| 2006/0197750 A1 | 9/2006 | Kerr et al. |
| 2006/0197753 A1 | 9/2006 | Hotelling |
| 2006/0238517 A1 | 10/2006 | King et al. |
| 2007/0103454 A1 | 5/2007 | Elias |
| 2008/0088602 A1 | 4/2008 | Hotelling |
| 2009/0067112 A1* | 3/2009 | Takabayashi ....... G02F 1/13452 361/220 |
| 2009/0147149 A1* | 6/2009 | Tomonaga ........... H04N 5/4403 348/734 |
| 2009/0257189 A1* | 10/2009 | Wang et al. ......... H04M 1/0249 361/679.56 |
| 2009/0295753 A1 | 12/2009 | King et al. |
| 2010/0033447 A1 | 2/2010 | Horie |
| 2011/0102341 A1 | 5/2011 | Imai et al. |
| 2011/0102342 A1 | 5/2011 | Iwawaki et al. |
| 2013/0063385 A1 | 3/2013 | Nishio |

FOREIGN PATENT DOCUMENTS

| | | |
|---|---|---|
| JP | 2003-344830 | 12/2003 |
| JP | 2004-280432 | 10/2004 |
| JP | 2004-284341 | 10/2004 |
| JP | 2004-355593 | 12/2004 |
| JP | 2005-209868 | 8/2005 |
| JP | 2005-222091 | 8/2005 |
| JP | 2008-532185 | 8/2008 |
| JP | 2009-199558 | 9/2009 |
| JP | 2010-244132 | 10/2010 |
| JP | 2011-034196 | 2/2011 |
| JP | 2011-090575 | 5/2011 |
| JP | 2011-113461 | 6/2011 |
| JP | 2011-215867 | 10/2011 |
| JP | 2011-249857 | 12/2011 |
| WO | 2011/142151 | 11/2011 |

OTHER PUBLICATIONS

Office Action in Japan Application No. 2014-44314, mail date is May 27, 2014, together with English language translation thereof.

* cited by examiner

FIG. 16

PORTABLE ELECTRONIC APPARATUS

CROSS REFERENCE TO RELATED APPLICATION

This application is a continuation of pending U.S. patent application Ser. No. 14/235,153, filed on Jan. 27, 2014, which is a National Stage Application of International Application No. PCT/JP2013/002628, filed Apr. 18, 2013, which claims priority to Japanese Application Nos. 2013-012483, filed Jan. 25, 2013; 2012-202988, filed Sep. 14, 2012; and 2012-095879, filed Apr. 19, 2012, which are expressly incorporated herein by reference in their entireties.

TECHNICAL FIELD

The present invention relates to a portable electronic apparatus having a display unit and a touch panel disposed on the display surface of the display unit, and more particularly, to a portable electronic apparatus having an electrostatic capacitance type touch panel.

BACKGROUND ART

Examples of electronic apparatuses incorporating a touch panel are described in Patent Documents 1 and 2. The electronic apparatus described in Patent Document 1 is characterized in that a module having a display member and a circuit board and a touch panel placed on the module are accommodated in a case with a display window and that the apparatus has a shield body equipped with a frame-shaped portion with a display opening and connection pieces for electrically connecting the case and the module, wherein the shield body is provided with positioning units for positioning the shield body and the module and pressing pieces for biasing the touch panel to position the module and the touch panel, the relative positions of the shield body, the module and the touch panel are determined via the shield body, and the shield body encloses the edge portions of the module and the touch panel to effectively block static electricity and noise.

The electronic apparatus described in Patent Document 2 has a main body case having a display opening, a display panel disposed so as to correspond to the opening inside the main body case, a conductive shield member covering the display panel except the display area corresponding to the opening of the display panel and connected to a reference potential, and waterproof cushion members disposed between the outer peripheral portion of the surface of the display panel and the shield member and between the shield member and the main body case so that impacts from the outside can be absorbed and waterproofness can be ensured using the cushion members.

A resistive film type, an electromagnetic induction type, an electrostatic capacitance type, etc. are available as touch panel types; the resistive film type is used in the electronic apparatus described in the above-mentioned Patent Document 1, and the type used in the electronic apparatus described in the above-mentioned Patent Document 2 is not specified. Since the electrostatic capacitance type is used in the present invention, the basics of this type will be described. FIG. 25 is a view showing the basic configuration of an electrostatic capacitance type touch panel. In the figure, an electrostatic capacitance type touch panel 90 has a dielectric 100, a transmission electrode 101, a reception electrode 102 and a driving butter 103, and the transmission electrode 101 and the reception electrode 102 are disposed so as to be separated from each other on the lower face of the plat-shaped dielectric 100. Drive pulses are applied from the driving butter 103 to the transmission electrode 101. When the drive pulses are applied, an electric field is generated from the transmission electrode 101; when a hand 104 enters this electric field, the number of the electric lines of force between the transmission electrode 101 and the reception electrode 102 decreases, and this change in the number of the electric lines of force is expressed as the change in charge in the reception electrode 102. Hence, the proximity of the hand 104 to the touch panel 90 can be detected. In addition, not only the proximity of the hand 104 to the touch panel 90 but also the position (coordinates) of the hand 104 can be detected by providing a plurality of transmission electrodes 101 and a plurality of reception electrodes 102. In other words, the coordinates of a fingertip hovering above the touch panel 90 can be detected.

FIGS. 26(a) to 26(c) are views showing finger detection states at the time when a fingertip 104a is gradually brought close to the touch panel 90. In the figures, FIG. 26(a) shows a state in which the fingertip 104a is away from the electric field. FIG. 26(b) shows a finger hovering detection state in which the fingertip 104a has entered the electric field. FIG. 26(c) shows a finger touch detection state in which the fingertip 104a has entirely entered the electric field and touches the touch panel 90. In the case that the fingertip 104a touches the touch panel 90 to operate it, the apparatus does not malfunction; however, in the case that the hand 104 touches the touch panel 90 at the time when the hand 104 simply holds the main body of the apparatus, the apparatus becomes in a malfunctioning state.

PRIOR ART DOCUMENT

Patent Document

Patent Document 1: JP-A-2005-222091
Patent Document 2: JP-A-2005-209868

SUMMARY OF THE INVENTION

Problem to be Solved by the Invention

When a portable electronic apparatus equipped with an electrostatic capacitance type touch panel is gripped with a hand and more particularly when the apparatus is gripped strongly, shield grounds provided inside the housing of the portable electronic apparatus are moved (in other words, distorted) together with the housing. Since the shield grounds are moved independently while the touch panel is not moved, the paths of the electric lines of force between the transmission electrodes and the reception electrodes of the touch panel are changed, thereby causing a problem that erroneous coordinate signals are output and the performance of the touch panel as a touch panel cannot be delivered. FIG. 27 is a view showing forces for pressing the housing of a portable electronic apparatus at the time when the apparatus is gripped with one hand. As shown in the figure, when the portable electronic apparatus is gripped with a hand, forces are applied in the directions indicated by the arrows shown in the figure. The shield grounds are moved independently by these forces.

In consideration of the above-mentioned circumstances, an object of the present invention is to provide a portable electronic apparatus equipped with an electrostatic capacitance type touch panel and characterized in that erroneous coordinate signals are not output from the touch panel even if the shield grounds thereof are moved together with the housing thereof at the time when the main body of the apparatus is gripped with a hand and that the performance of the touch panel as a touch panel can be ensured.

Means for Solving the Problem

A portable electronic apparatus according to the present invention comprises a housing having at least a first face and first and second side faces rising from the first face; a display unit having at least a first side and a second side which is opposed to the first side; a touch panel disposed so as to be stacked on the display unit and being capable of detecting at least a distance to an indicator using an electric field; first and second conductive members respectively disposed at end parts of the display unit along the first side and the second side; and third and fourth conductive members disposed along a bottom face of the display unit and electrically connected to the first and second conductive members respectively, at least the display unit and the third and fourth conductive members are accommodated in a concave part configured by the first side face, the first face and the second side face.

With the above-mentioned configuration, when the main body of the apparatus is gripped with a hand, the paths of the electric lines of force between the transmission electrodes and the reception electrodes of the touch panel are unchanged because the first to fourth conductive members are moved together with the touch panel, whereby erroneous coordinate signals are not output. In other words, even if the housing and the first to fourth conductive members are distorted, since the relative positional relation between the touch panel and the first to fourth conductive members is maintained, whereby normal coordinate signals are output at all times and the performance of the touch panel as a touch panel can be ensured.

In the above-mentioned configuration, the third and fourth conductive members are electrically connected to each other.

In the above-mentioned configuration, at least the third and fourth conductive members are secured to the display unit.

In the above-mentioned configuration, at least the third and fourth conductive members are not secured to the first face.

In the above-mentioned configuration, the first conductive member and the third conductive member are integrated and/or the second conductive member and the fourth conductive member are integrated.

In the above-mentioned configuration, the touch panel has at least the first side and the second side and the portable electronic apparatus further comprises fifth and sixth conductive members disposed at the end parts of the touch panel along the first and second sides, respectively, and electrically connected to the first and second conductive members, respectively.

With the above-mentioned configuration, since the fifth conductive member electrically connected to the first conductive member and the sixth conductive member electrically connected to the second conductive member are disposed at the end parts of the touch panel, even if the housing and the first to sixth conductive members are distorted, the relative positional relation among the first to sixth conductive members is ensured, whereby normal coordinate signals are output at all times and the performance of the touch panel as a touch panel can be ensured.

In the above-mentioned configuration, the first conductive member and the fifth conductive member are integrated and/or the second conductive member and the sixth conductive member are integrated.

In the above-mentioned configuration, the display unit is disposed at least between the first face and the touch panel.

In the above-mentioned configuration, the third and fourth conductive members are disposed at least between the display unit and the first face.

In the above-mentioned configuration, at least the touch panel, the display unit, and the first, second, third, fourth, fifth and sixth conductive members are accommodated in the concave part.

In the above-mentioned configuration, the portable electronic apparatus further comprises a seventh conductive member disposed along the first face and having a planar shape, and the third conductive member, the seventh conductive member and the fourth conductive member are electrically connected to each other.

In the above-mentioned configuration, at least part of the seventh conductive member and at least part of the third conductive member are disposed so as to be overlapped and/or at least part of the seventh conductive member and at least part of the fourth conductive member are disposed so as to be overlapped.

In the above-mentioned configuration, the overlapped portions of the seventh conductive member and the third conductive member and/or the overlapped portions of the seventh conductive member and the fourth conductive member have contact portions, which have elasticity and conductivity, capable of electrically connecting the seventh conductive member and the third conductive member and electrically connecting the seventh conductive member and the fourth conductive member.

In the above-mentioned configuration, the contact portions are configured so as to be movable between the seventh conductive member and the third conductive member and/or between the seventh conductive member and the fourth conductive member.

In the above-mentioned configuration, at least one of the first, second, third, fourth, fifth, sixth and seventh conductive members has at least metal and/or graphite.

In the above-mentioned configuration, the housing has at least a second face being nearly parallel with the first face on the opposite side of the concave part on the basis of the first face.

In the above-mentioned configuration, a battery can be installed between the first face and the second face.

In the above-mentioned configuration, the first and second side faces are continuous to the second face.

In the above-mentioned configuration, the first and second side faces can be gripped with a hand of the user.

In the above-mentioned configuration, the first and second side faces can be gripped with one hand of the user.

In the above-mentioned configuration, the second face can be supported with the one hand.

In the above-mentioned configuration, the portable electronic apparatus further comprises an eighth conductive member disposed along the bottom face of the display unit and electrically connected to the third and fourth conductive members.

In the above-mentioned configuration, the third conductive member and the eighth conductive member are integrated and/or the fourth conductive member and the eighth conductive member are integrated.

In the above-mentioned configuration, the first face has a support unit which supports at least one of the first, second and eighth conductive members.

A portable electronic apparatus according to the present invention is equipped with a housing having a first face and first and second side faces rising from the first face and having at least a concave part configured by the first side face, the first face and the second side face; a display unit, at least part of which is accommodated in the concave part; a touch panel disposed so as to be stacked on the display unit and being capable of detecting at least a distance to an indicator; and first and second conductive members disposed on the first and second side faces, respectively, wherein at least a part of the first and/or second conductive members is opposed to a side face of the display unit.

With the above-mentioned configuration, since the first conductive member is disposed on the first side face of the housing and the second conductive member is disposed on the second side face of the housing, the influence of a holding hand on the portable electronic apparatus can be suppressed.

In the above-mentioned configuration, the portable electronic apparatus further comprises third and fourth conductive members disposed along the first face and electrically connected to the first and second conductive members, respectively.

In the above-mentioned configuration, the third and fourth conductive members are electrically connected to each other.

In the above-mentioned configuration, the portable electronic apparatus further comprises a fifth conductive member disposed along the first face and having a planar shape, and the third conductive member, the fifth conductive member and the fourth conductive member are electrically connected to each other.

In the above-mentioned configuration, at least part of the fifth conductive member and at least part of the third conductive member are disposed so as to be overlapped and/or at least part of the fifth conductive member and at least part of the fourth conductive member are disposed so as to be overlapped.

In the above-mentioned configuration, the overlapped portions of the fifth conductive member and the third conductive member and/or the overlapped portions of the fifth conductive member and the fourth conductive member have engaging portions, which have conductivity, capable of electrically connecting the fifth conductive member and the third conductive member and electrically connecting the fifth conductive member and the fourth conductive member.

In the above-mentioned configuration, the portable electronic apparatus further comprises a cover glass which covers at least the display unit and the first conductive member and/or at least the display unit and the second conductive member, the first conductive member and/or the second conductive member is made of sheet metal, and the first side face and/or the second side face of the housing has a positioning unit which positions the first conductive member and/or the second conductive member at least in vertical direction.

With the above-mentioned configuration, since the positioning units for positioning the first conductive member and the second conductive member in the vertical direction are provided, the first conductive member and the second conductive member can be functioned as shield grounds.

In the above-mentioned configuration, the positioning unit is a protrusion provided on the first side face and/or the second side face of the housing.

Advantage of the Invention

The portable electronic apparatus according to the present invention, equipped with an electrostatic capacitance type touch panel, has advantages such that erroneous coordinate signals are not output from the touch panel even if the shield grounds are moved together with the housing at the time when the main body of the apparatus is gripped with a hand and that the performance of the touch panel as a touch panel can be ensured.

BRIEF DESCRIPTION OF THE DRAWINGS

FIG. 16 is a view showing an example of a method for detecting the hand holding states of the portable electronic apparatus shown in FIG. 13;

MODE FOR CARRYING OUT THE INVENTION

Figure 1:
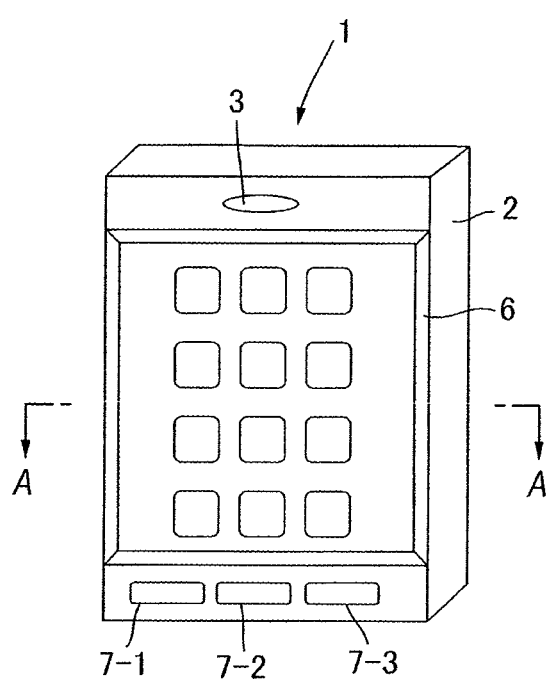
FIG. 1 is a perspective view showing an outline of a portable electronic apparatus according to Embodiment 1 of the present invention.

Preferred embodiments for embodying the present invention will be described below in detail referring to the drawings.

Embodiment 1

FIG. 1 is a perspective view showing an outline of a portable electronic apparatus according to Embodiment 1 of the present invention. In the figure, the portable electronic apparatus 1 according to this embodiment is a portable radio apparatus referred to as a smart phone, in which a receiver 3 is provided in the front upper portion of a housing 2 formed into a quadrangular shape, an electrostatic capacitance type touch panel module 6 is provided below the receiver 3, and three function buttons 7-1 to 7-3 are provided below the touch panel module 6.

Figure 2:
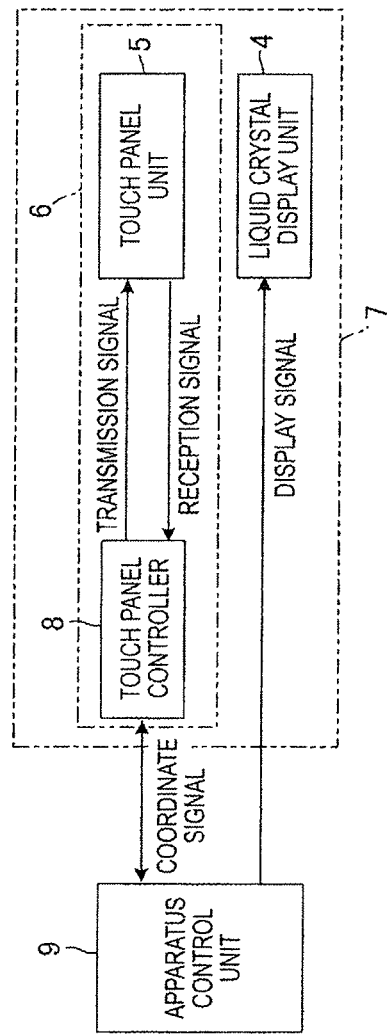
FIG. 2 is a block diagram showing an outline configuration of the portable electronic apparatus shown in FIG. 1.

FIG. 2 is a block diagram showing an outline configuration of the portable electronic apparatus 1 according to this embodiment. In the portable electronic apparatus 1 shown in the figure, the above-mentioned touch panel module 6 includes a touch panel unit 5 and a touch panel controller 8, transmission signals and reception signals being transmitted and received therebetween. An apparatus control unit 9 transmits and receives coordinate signals between the apparatus control unit 9 and the touch panel controller 8 and transmits display signals to a liquid crystal display unit 4. A touch panel unit 7 includes the liquid crystal display unit 4 and the touch panel module 6.

The liquid crystal display unit 4 of the touch panel unit 7 has a quadrangular shape and is used to display screens for operating the portable electronic apparatus 1, images, etc. The touch panel unit 5 has a quadrangular shape nearly similar to that of the liquid crystal display unit 4 and is disposed so as to be stacked on the liquid crystal display unit 4. Although the shapes of the liquid crystal display unit 4 and the touch panel unit 5 are quadrangular, they may be rectangular or square.

Figure 3:
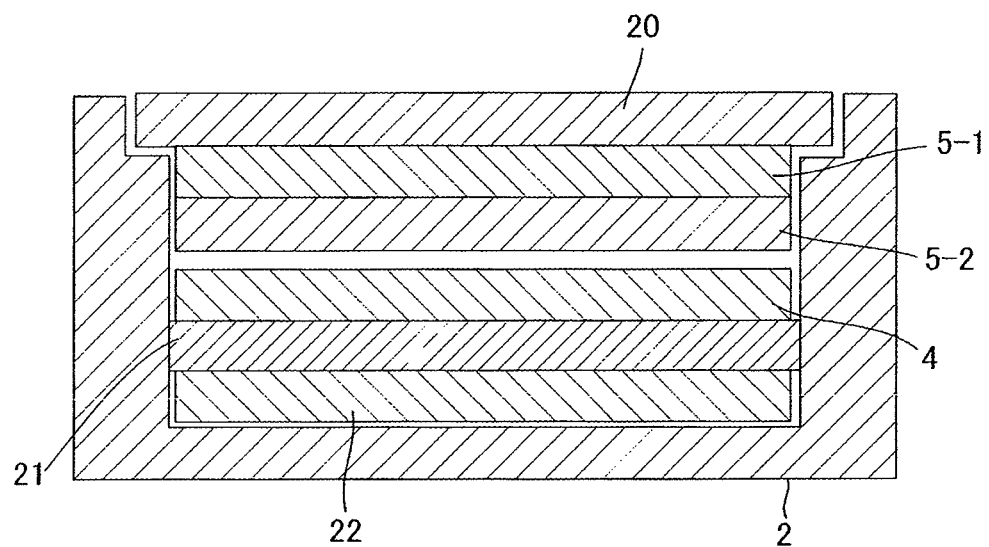
FIG. 3 is a sectional view showing the portable electronic apparatus, taken on line A-A of FIG. 1.

FIG. 3 is a sectional view taken on line A-A of FIG. 1. The figure shows the cross section of the central portion of the touch panel unit 7. The touch panel unit 5 of the touch panel unit 7 includes a reception sensor panel (first sensor panel) 5-1 and a transmission sensor panel (second sensor panel) 5-2. A cover panel 20 made of glass is disposed just above the reception sensor panel 5-1, and the liquid crystal display unit 4 is disposed just below the transmission sensor panel 5-2. Furthermore, a backlight unit 21 is disposed just below the liquid crystal display unit 4, and a battery unit 22 is disposed just below the backlight unit 21.

Figure 4:
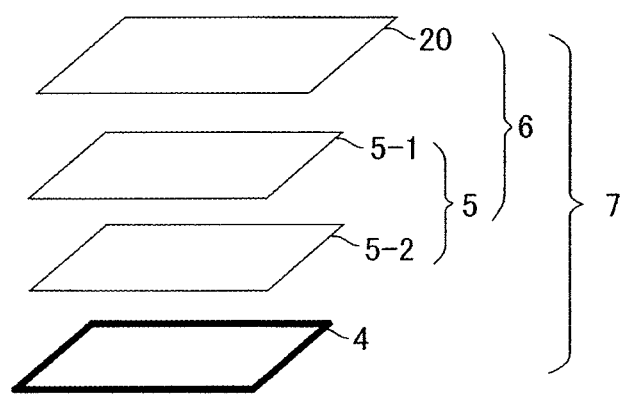
FIG. 4 is a perspective view showing the disposition relation among a cover panel, a reception sensor panel, a transmission sensor panel and a liquid crystal display unit in the touch panel unit of the portable electronic apparatus shown in FIG. 1.

FIG. 4 is a perspective view showing the disposition relation among the cover panel 20, the reception sensor panel 5-1 and the transmission sensor panel 5-2 of the touch panel unit 5, and the liquid crystal display unit 4. As shown in the figure, the cover panel 20, the reception sensor panel 5-1, the transmission sensor panel 5-2 and the liquid crystal display unit 4 are disposed in this order.

Figure 5:
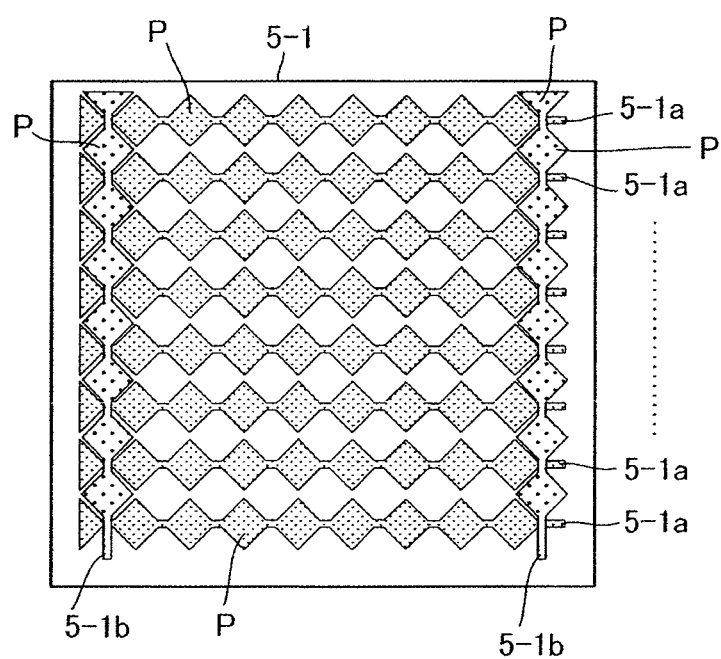
FIG. 5 is a plan view showing the reception sensor panel of the touch panel unit of the portable electronic apparatus shown in FIG. 1.

FIG. 5 is a plan view showing the reception sensor panel 5-1 of the touch panel unit 5. As shown in the figure, the reception sensor panel 5-1 is formed into a quadrangular shape and has a plurality of reception electrodes 5-1a disposed in parallel with the horizontal direction from the upper end to the lower end thereof and two transmission electrodes 5-1b disposed in the vertical direction on the left end side and the right end side thereof. Each reception electrode 5-1a and each transmission electrode 5-1b are formed of a plurality of electrode pieces P having a rhombic shape. However, the electrode pieces P located at the tip ends of the two transmission electrodes 5-1b have a triangular shape.

Figure 6:
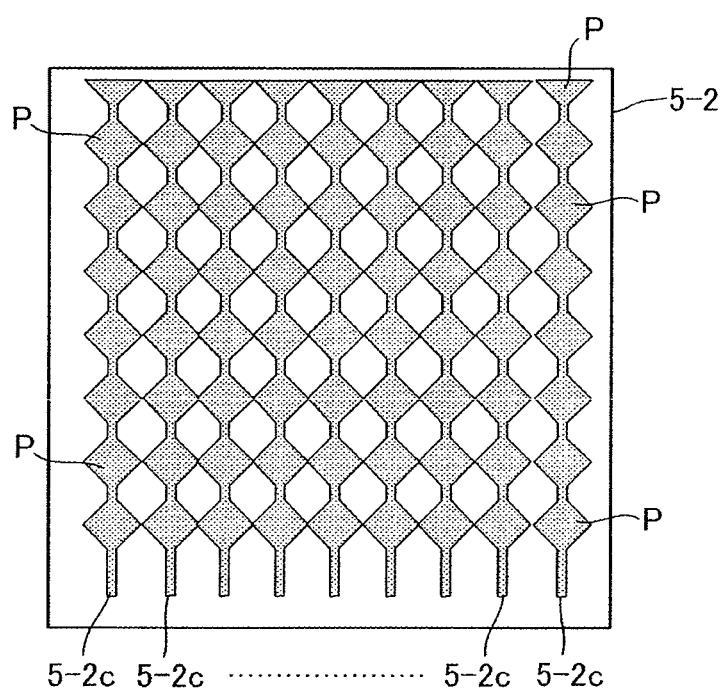
FIG. 6 is a plan view showing the transmission sensor panel of the touch panel unit of the portable electronic apparatus shown in FIG. 1.

FIG. 6 is a plan view showing the transmission sensor panel 5-2 of the touch panel unit 5. As shown in the figure, the transmission sensor panel 5-2 is formed into a quadrangular shape as in the case of the reception sensor panel 5-1 and has a plurality of transmission electrodes 5-2c disposed in parallel with the vertical direction from the left end to the right end thereof (or in the opposite direction). Each transmission electrode 5-2c is formed of a plurality of electrode pieces P having a rhombic shape as in the cases of the reception electrode 5-1a and the transmission electrode 5-1b of the reception sensor panel 5-1. However, the electrode pieces P located at the tip ends of the transmission electrodes 5-2c have a triangular shape.

Figure 7:
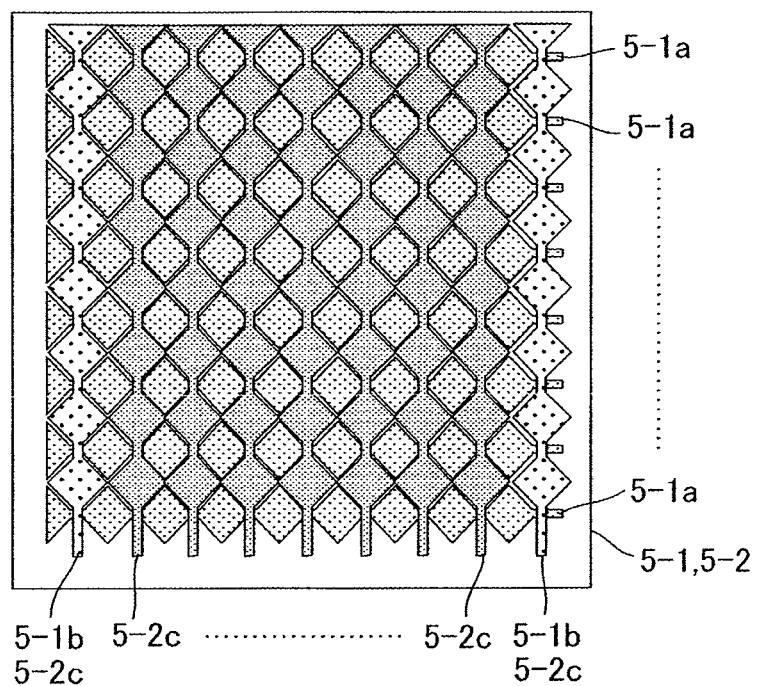
FIG. 7 is a plan view showing a state in which the reception sensor panel and the transmission sensor panel of the portable electronic apparatus shown in FIG. 1 are stacked and disposed.

FIG. 7 is a plan view showing a state in which the reception sensor panel 5-1 and the transmission sensor panel 5-2 are stacked and disposed. As shown in the figure, in the configuration in which the reception sensor panel 5-1 and the transmission sensor panel 5-2 are stacked and disposed, the transmission electrodes 5-1b on the left end side and the right end side of the reception sensor panel 5-1 are stacked on the transmission electrodes 5-2c on the left end side and the right end side of the transmission sensor panel 5-2, and the other electrodes are not stacked with one another but disposed alternately longitudinally and laterally.

In the portable electronic apparatus 1 according to the embodiment, 90% or more of the reception sensor panel 5-1 is stacked on the transmission sensor panel 5-2. In addition, the area in which the reception sensor panel 5-1 is stacked on the transmission sensor panel 5-2 is used as a reaction area serving as the touch panel module 6. The two transmission electrodes 5-1b of the reception sensor panel 5-1 are disposed in the outermost periphery of the reaction area. In this case, when it is assumed that the shape of the touch panel unit 5 is a rectangle, the two transmission electrodes 5-1b are respectively disposed along the two sides opposed to each other. The number of the transmission electrodes 5-1b of the reception sensor panel 5-1 may be one or may be three or more.

Returning to FIG. 2, the touch panel controller 8 applies transmission signals to all the transmission electrodes 5-2c of the transmission sensor panel 5-2. Regarding the application at this time, the order of the application can be changed arbitrarily by the control of the touch panel controller 8. Hence, all the transmission signals can be transmitted synchronously. Transmission signals are applied sequentially one by one from the transmission electrode 5-2c disposed at the left end to the transmission electrode 5-2c disposed at the right end. Furthermore, when applying transmission signals to the transmission electrode 5-2c disposed at the left end and the transmission electrode 5-2c disposed at the right end, the touch panel controller 8 also applies transmission signals to the transmission electrode 5-1b disposed on the left end side and the transmission electrode 5-1b disposed on the right end side at the same timing. In other words, the controller applies a transmission signal to the transmission electrode 5-2c disposed on the left end side and also applies the same transmission signal to the transmission electrode 5-1b disposed on the left end side, and applies a transmission signal to the transmission electrode 5-2c disposed at the right end and also applies the same transmission signal to the transmission electrode 5-1b disposed at the right end.

Furthermore, the touch panel controller 8 applies transmission signals to the transmission electrodes 5-2c of the transmission sensor panel 5-2 and at the same time detects the transmission signals at all the reception electrodes 5-1a of the reception sensor panel 5-1. In other words, the controller applies a transmission signal to a transmission electrode 5-2c and at the same time detects the transmission signal sequentially at the reception electrodes 5-1a ranging from the reception electrode 5-1a disposed at the upper end side to the reception electrode 5-1a disposed at the lower end. Hereafter, a detected transmission signal is referred to as a reception signal.

Figure 8:
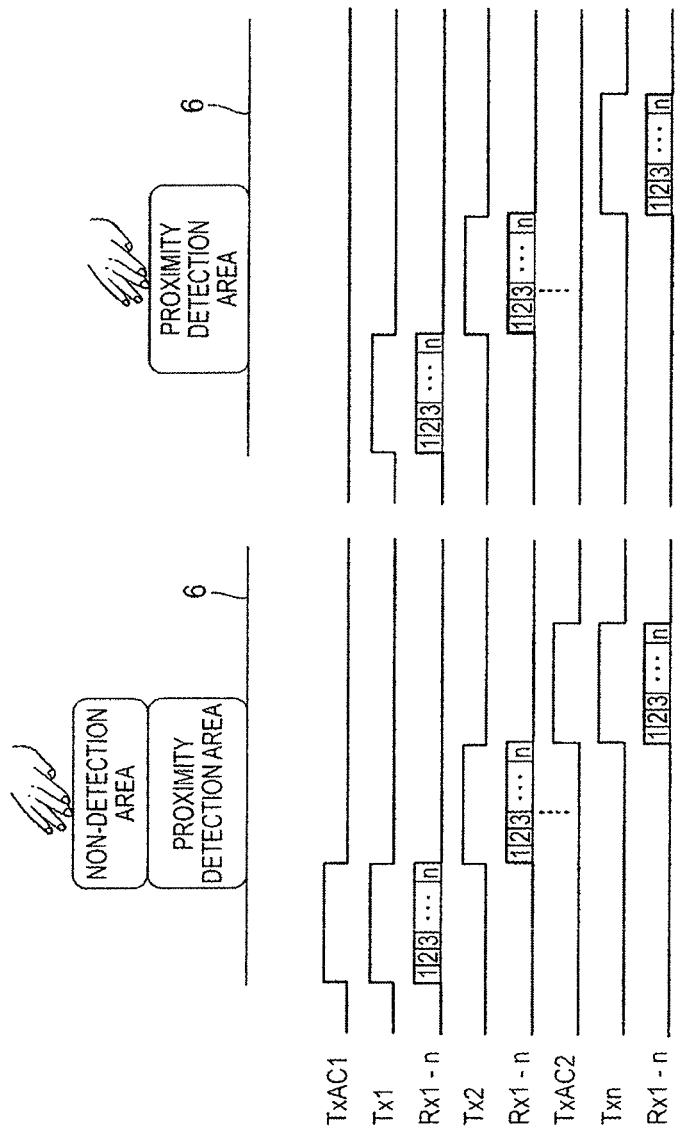
FIG. 8 is a timing chart showing the operation of the touch panel controller of the portable electronic apparatus shown in FIG. 1.

FIG. 8 is a timing chart showing the operation of the touch panel controller 8. In the figure, "TxAC1" represents a transmission signal to be applied to the transmission electrode 5-1b disposed on the left end side of the reception sensor panel 5-1, "Tx1" represents a transmission signal to be applied to the transmission electrode 5-2c disposed on the left end side of the transmission sensor panel 5-2, "Rx1 to n" represent reception signals obtained at all the reception electrodes 5-1a of the reception sensor panel 5-1. In addition, "Tx2" represents a transmission signal to be applied to the transmission electrode 5-2c disposed second from the left end of the transmission sensor panel 5-2, "Txn" represents a transmission signal to be applied to the transmission electrode 5-2c disposed on the right end side of the transmission sensor panel 5-2, and "TxAC2" represents a transmission signal to be applied to the transmission electrode 5-1b disposed on the right end side of the reception sensor panel 5-1.

As shown in FIG. 8, each time the controller applies transmission signals one by one sequentially to all the transmission electrodes 5-2c of the transmission sensor panel 5-2, the controller receives the transmission signals at all the reception electrodes 5-1a of the reception sensor panel 5-1. When a transmission signal is applied to the transmission electrode 5-2c disposed on the left end side of the transmission sensor panel 5-2, the same transmission signal is applied to the transmission electrode 5-1b disposed on the left end side of the reception sensor panel 5-1. Furthermore, when a transmission signal is applied to the transmission electrode 5-2c disposed on the right end side of the transmission sensor panel 5-2, the same transmission signal is applied to the transmission electrode 5-1b disposed on the right end side of the reception sensor panel 5-1. However, the operation in this case is the operation to be performed when a human hand is not detected, that is, when the human hand is located in a non-detection area; when the human hand is detected, that is, when the human hand enters a proximity detection area, no transmission signal is applied to the two transmission electrodes 5-1b disposed on the left end side and the right end side of the reception sensor panel 5-1, and the potentials of the electrodes become the ground potential.

In the case that the transmission signals are applied to both the transmission electrode 5-2c disposed on the left end side of the transmission sensor panel 5-2 and the transmission electrode 5-1b disposed on the left end side of the reception sensor panel 5-1, electric field intensity becomes strong and sensitivity rises, whereby the proximity of a human hand can be detected with high sensitivity. Conversely, in the case that no transmission signal is applied to the transmission electrode 5-1b disposed on the left end side of the reception sensor panel 5-1, the transmission electrode 5-1b inhibits the electric field of the transmission electrode 5-2c disposed on the left end side of the transmission sensor panel 5-2, whereby the sensitivity becomes low. Since the sensitivity become low, when the portable electronic apparatus 1 is held with a hand, even if the fingers of the hand touch both the left and right end portions of the touch panel unit 5, it is possible that the touch is not recognized as an operation. This is similarly applicable to the case in which transmission signals are applied to both the transmission electrode 5-2c disposed on the right end side of the transmission sensor panel 5-2 and the transmission electrode 5-1b on the right end side of the reception sensor panel 5-1.

Figure 9:
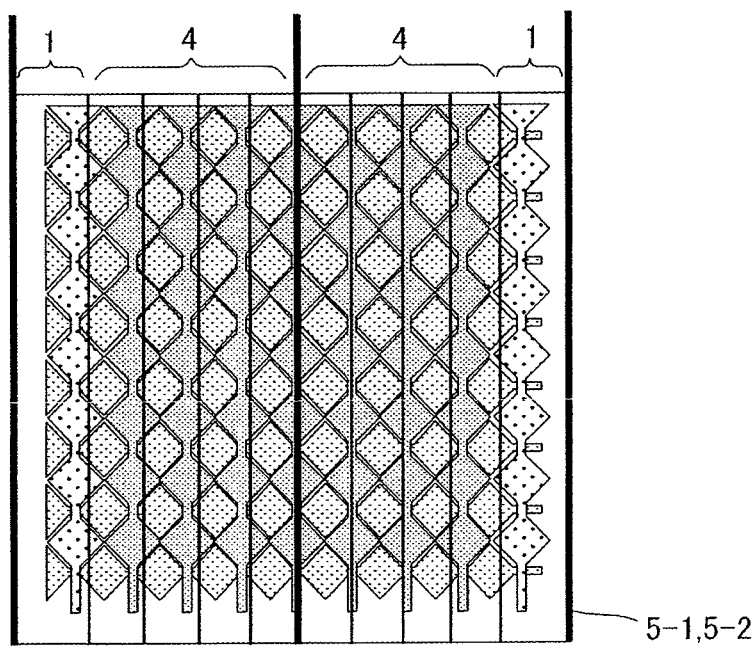
FIG. 9 is a view illustrating the disposition positions of transmission electrodes in the reception sensor panel of the portable electronic apparatus shown in FIG. 1.

As describe above, the two transmission electrodes 5-1b of the reception sensor panel 5-1 are provided so that when the portable electronic apparatus 1 is gripped with a hand, even if the fingers of the hand approach both the left and right end portions of the touch panel unit 5, the apparatus control unit 9 does not recognize that the approach is an operation. As shown in FIG. 9, it is preferable that, on the basis of the line passing the center (for example, gravity center) of the touch panel unit 5, each of the two transmission electrodes 5-1b is disposed between the end of the touch panel unit 5 and the point at which the range from the end of the touch panel unit 5 to the center of the touch panel unit 5 is internally divided at the ratio of 1 to 4. Furthermore, the number of the transmission electrodes 5-1b is not limited to one on each of the left and right sides, but may be one or more.

In addition to the above-mentioned process, the apparatus control unit 9 outputs a display signal for displaying a predetermined display screen on the liquid crystal display unit 4 at the time when the proximity of a human hand is not detected, and the control unit stops the output of the display signal at the time when the proximity of a human hand is detected. This configuration enables the user of the portable electronic apparatus 1 to recognize that the sensitivity at the peripheral portion of the touch panel unit 5 has risen.

Figure 10:
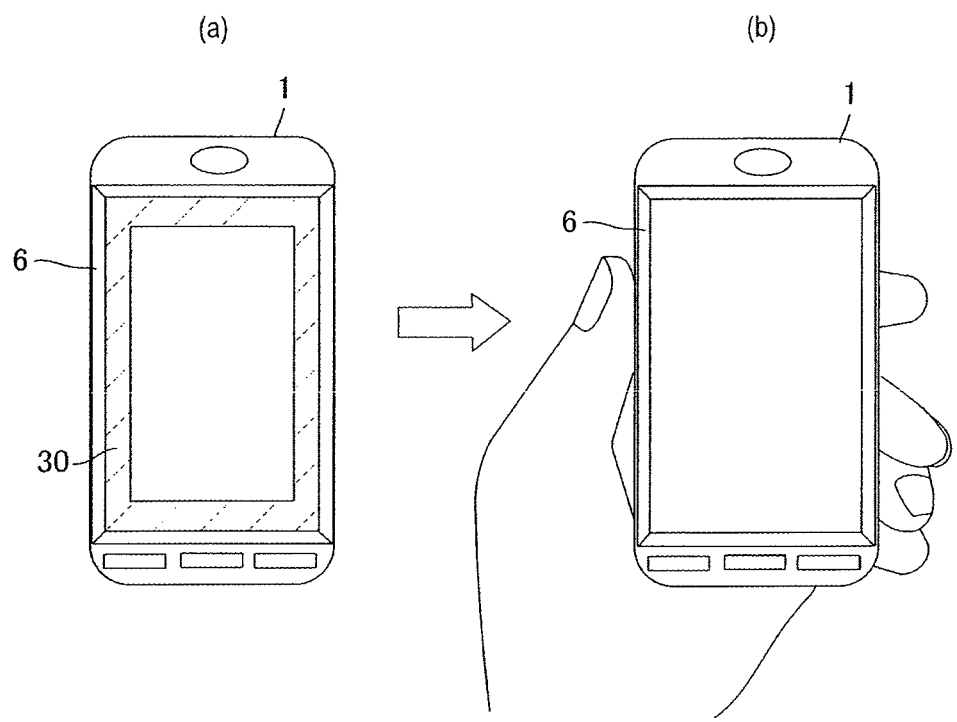
FIGS. 10(a) and 10(b) are views showing the change in display between the time when the proximity of a human hand is not detected and the time when the proximity of the human hand is detected in the portable electronic apparatus shown in FIG. 1.

FIGS. 10(a) and 10(b) are views showing the change in display on the liquid crystal display unit 4 between the time when the proximity of a human hand is not detected and the time when the proximity of the human hand is detected. As shown in FIG. 10(a), when the proximity of the human hand is not detected, a belt-like display 30 (for example, an orange display) appears along the peripheral portion of the liquid crystal display unit 4. When proximity of the human hand is detected, the belt-like display 30 is not exhibited as shown in FIG. 10(*b*).

When the human hand approaches the touch panel unit 5, the reception signal of the reception electrode 5-1*a* of the reception sensor panel 5-1 located close to the human hand having approached changes, whereby the apparatus control unit 9 specifies the position at which the hand has approached according to the coordinate signal corresponding to the reception electrode 5-1*a* at which the reception signal has changed.

The touch panel controller 8 and the apparatus control unit 9 each includes a CPU (central processing unit), a ROM (read-only memory), a ROM (random access memory) and an interface circuit. Programs for controlling the CPU are stored in the ROM, and the RAM is used for the operation of the CPU.

Next, the operation of the portable electronic apparatus 1 according to this embodiment will be described.

Figure 11:
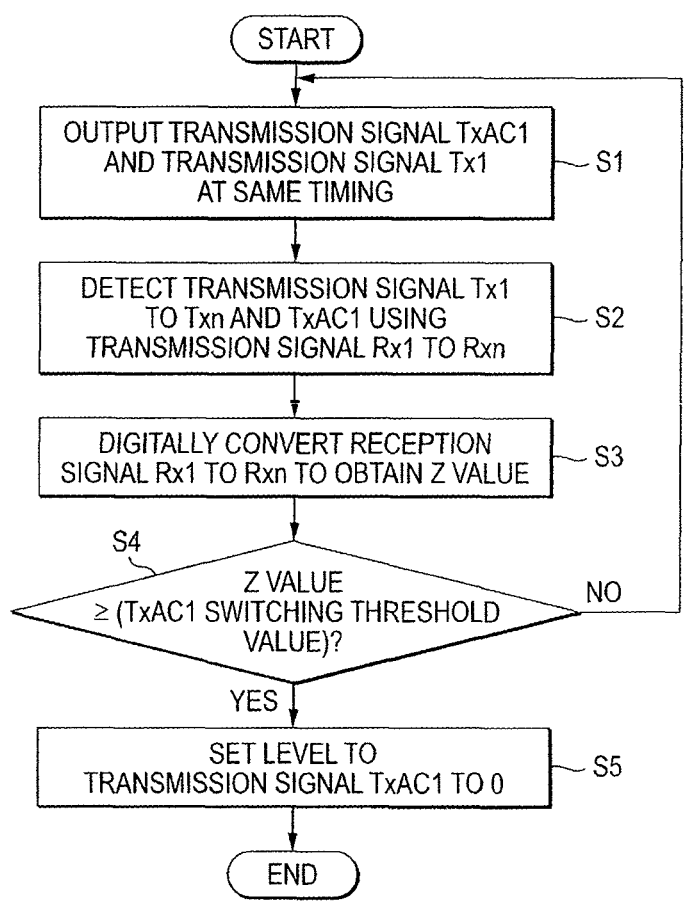
FIG. 11 is a flow chart illustrating the operation of the touch panel controller of the portable electronic apparatus shown in FIG. 1.

FIG. 11 is a flow chart illustrating the operation of the touch panel controller 8 of the portable electronic apparatus 1 according to this embodiment. The flow chart shown in the figure exhibits the operation in the case that a transmission signal is applied to each of the transmission electrode 5-1*b* disposed on the left end side of the reception sensor panel 5-1 and the transmission electrode 5-2*c* disposed on the left end side of the transmission sensor panel 5-2.

The touch panel controller 8 first applies the transmission signals TxAC1 and Tx1 to the transmission electrode 5-1*b* disposed on the left end side of the reception sensor panel 5-1 and the transmission electrode 5-2*c* of the transmission sensor panel 5-2 at the same timing (at step S1). After the application of the transmission signals TxAC1 and Tx1, the controller detects the transmission signals Tx1 to Txn and TxAC1 using the reception signals Rx1 to Rxn received by all the reception electrodes 5-1*a* of the reception sensor panel 5-1 (at step S2). After the detection of the transmission signals Tx1 to Txn and TxAC1, the controller digitally converts the reception signals Rx1 to Rxn to obtain a Z value (at step S3). The controller then judges whether the obtained Z value is equal to or more than a TxAC1 switching threshold value (at step S4). The TxAC1 switching threshold value is herein a value corresponding to the Z value obtained when the portable electronic apparatus 1 is gripped by a person.

In the case that the obtained Z value is less than the TxAC1 switching threshold value (that is, in the case that the judgment at step S4 is "NO"), the process returns to step S1; in the case that the obtained Z value is equal to or more than the TxAC1 switching threshold value (that is, in the case that the judgment at step S4 is "YES"), the potential of the transmission electrode 5-1*b* disposed on the left end side of the reception sensor panel 5-1 is set to the ground potential, and the level of the transmission signal TxAC1 is set to 0 (at step S5), and the process is ended.

In the case that a transmission signal is applied to each of the transmission electrode 5-1*b* disposed on the right end side of the reception sensor panel 5-1 and the transmission electrode 5-2*c* disposed on the right end side of the transmission sensor panel 5-2, the left end side may be replaced with the right end side and the transmission signal TxAC1 may be replaced with the transmission signal TxAC2.

As describe above, the portable electronic apparatus 1 according to this embodiment is equipped with the touch panel unit 7 including the liquid crystal display unit 4 and the electrostatic capacitance type touch panel unit 5, the touch panel controller 8 for transmitting transmission signals and receiving reception signals to and from the touch panel unit 5 of the touch panel module 6 and, and the apparatus control unit 9 for transmitting and receiving coordinate signals to and from the touch panel controller 8 and for transmitting display signals to the liquid crystal display unit 4, wherein the touch panel unit 5 includes the reception sensor panel 5-1 having the plurality of reception electrodes 5-1*a* disposed in parallel with the horizontal direction and the two transmission electrodes 5-1*b* respectively disposed in the vertical direction on the left end side and the right end side and the transmission sensor panel 5-2 having the plurality of transmission electrodes 5-2*c* disposed in parallel with the vertical direction from the left end to the right end thereof, and the same transmission signals are applied to both the transmission electrode 5-2*c* of the transmission sensor panel 5-2 and the transmission electrode 5-1*b* of the reception sensor panel 5-1 to detect the proximity of a human hand, and after the detection of the proximity of the human hand, the potential of the transmission electrode 5-1*b* of the reception sensor panel 5-1 is set to the ground potential to lower the sensitivity, whereby the influence of the hand on the hand-held portion of the portable electronic apparatus 1 at the time when the apparatus is held can be suppressed.

In the portable electronic apparatus 1 according to this embodiment, although the reception sensor panel 5-1 is composed of the plurality of reception electrodes 5-1*a* and the two transmission electrodes 5-1*b*, the two transmission electrodes 5-1*b* may be provided on a panel (third sensor panel) different from the reception sensor panel 5-1. Furthermore, 90% or more of this third sensor panel is preferably overlapped with the transmission sensor panel 5-2.

In other words, in the portable electronic apparatus 1 according to this embodiment, although the plurality of reception electrodes 5-1*a* and the two transmission electrodes 5-1*b* are provided on the surface (the outer face of the portable electronic apparatus 1) of the reception sensor panel 5-1 (the first sensor panel) and the plurality of transmission electrodes 5-2*c* are provided on the surface (the outer face of the portable electronic apparatus 1) of the transmission sensor panel 5-2 (the second sensor panel), the two transmission electrodes 5-1*b* may be provided on the panel (the third sensor panel) different from the reception sensor panel 5-1.

Furthermore, the plurality of reception electrodes 5-1*a*, the two transmission electrodes 5-1*b* and the plurality of transmission electrodes 5-2*c* may merely be disposed on the surface face (the outer face of the portable electronic apparatus 1) the reverse surface (the inner face of the portable electronic apparatus 1) of one or more of the sensor panels. For example, at least one transmission electrode 5-1*b* may be disposed on the surface (first face) of the reception sensor panel 5-1 (the first sensor panel), the reception electrodes 5-1*a* may be disposed on the reverse surface (second face) of the reception sensor panel 5-1, and the transmission electrodes 5-2*c* may be disposed on the reverse surface (third face) of the transmission sensor panel 5-2 (the second sensor panel).

Figure 12:
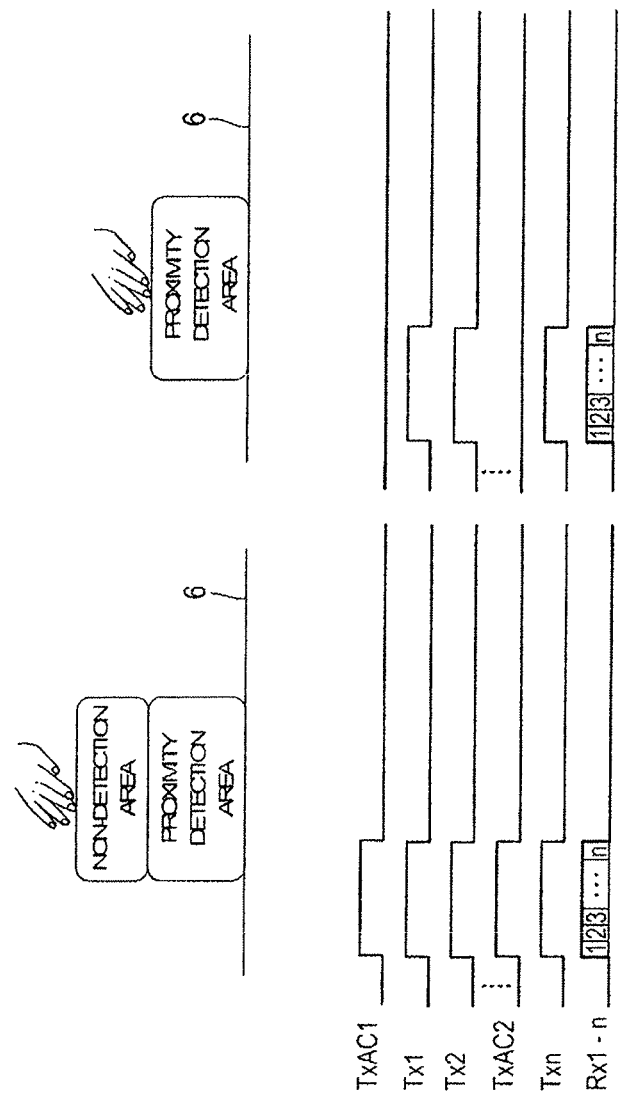
FIG. 12 is a timing chart showing the operation of the touch panel controller of an application of the portable electronic apparatus shown in FIG. 1.

Moreover, in the portable electronic apparatus 1 according to this embodiment, although transmission signals are applied sequentially one by one to the plurality of transmission electrodes 5-2*c* of the transmission sensor panel 5-2 as shown in the timing chart of FIG. 8, the transmission signals may be applied simultaneously to the plurality of transmission electrodes 5-2*c* of the transmission sensor panel 5-2 as shown in the timing chart of FIG. 12.

What's more, in the portable electronic apparatus 1 according to the embodiment, although the program describing the process shown in the flow chart of FIG. 11 is stored in the ROM, the program may be stored in a storage medium, such as a magnetic disk, an optical disk, a magneto-optical disk or a flash memory and delivered, or may be stored in a server (not shown) on a network, such as the Internet, so that the program can be downloaded using electric communication lines.

Embodiment 2

Figure 13:
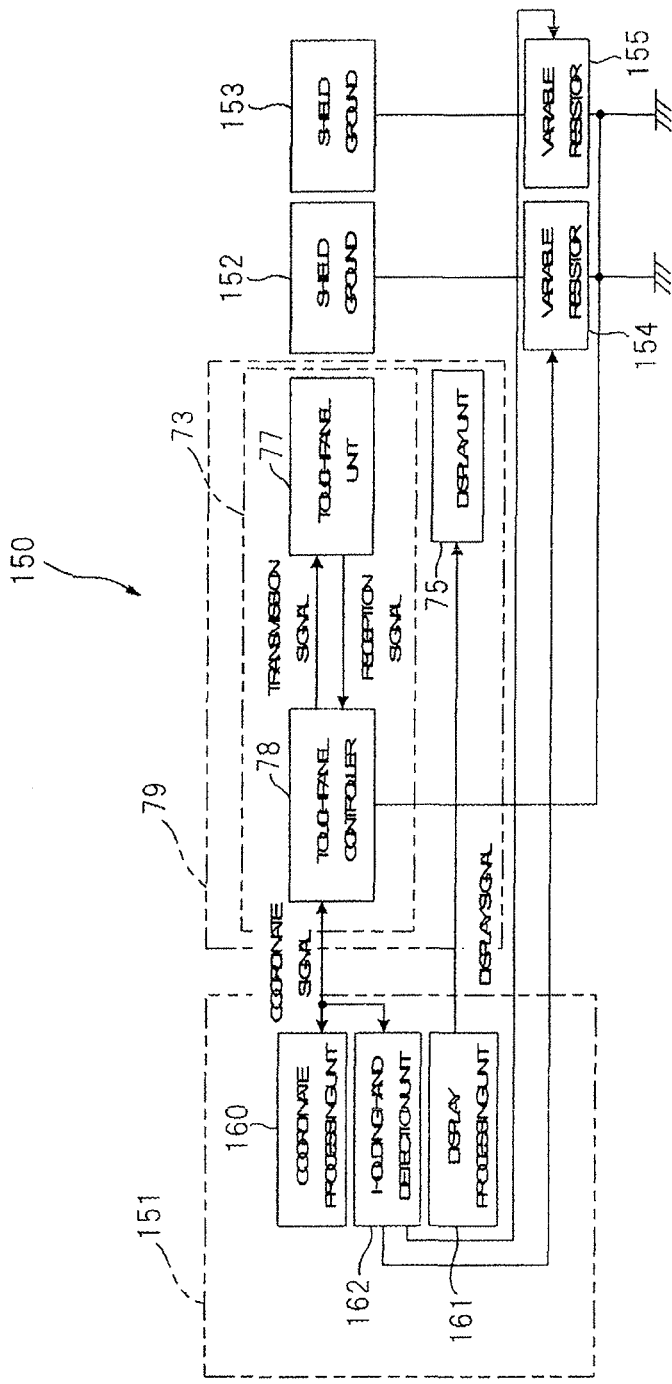
FIG. 13 is a block diagram showing an outline configuration of a portable electronic apparatus according to Embodiment 2 of the present invention.

FIG. 13 is a block diagram showing an outline configuration of a portable electronic apparatus according to Embodiment 2 of the present invention. However, since the portable electronic apparatus 150 according to this embodiment is a portable radio apparatus referred to as a smart phone similar to the portable electronic apparatus 1 according to the above-mentioned embodiment 1 and the outline thereof is similar to those of such apparatuses, the outline view thereof is omitted, and FIG. 1 is applied by analogy as necessary for explanation.

In FIG. 13, the portable electronic apparatus 150 according to this embodiment is equipped with a touch panel module 73, a display unit 75, an apparatus control unit 151, shield grounds 152 and 153, and variable resistors 154 and 155. The touch panel module 73 includes a touch panel unit (touch panel) 77 and a touch panel controller 78, transmission signals and reception signals being transmitted and received therebetween. The display unit (display unit) 75 has an LCD, an organic EL display or an electronic paper and displays screens for operating the portable electronic apparatus 150, images, etc.

The apparatus control unit 151 performs processes (in other words, transmitting and receiving coordinate signals to and from the touch panel controller 78 and transmitting display signals to the display unit 75) similar to those performed by the apparatus control unit 9 of the portable electronic apparatus 1 according to the above-mentioned Embodiment 1 and further performs, in addition to these basic processes, a process for suppressing malfunction caused by a holding hand during hovering by making the impedances of the shield grounds 152 and 153 variable. As means for performing these processes, the apparatus control unit 151 is equipped with a coordinate processing unit 160 for performing coordinate processing by transmitting and receiving coordinate signals to and from the touch panel controller 78, a display processing unit 161 for transmitting display signals to the display unit 75, a holding hand detection unit 162 for detecting the hand of the user holding the portable electronic apparatus 150 and for switching the resistance values of the variable resistors 154 and 155.

Figure 14:
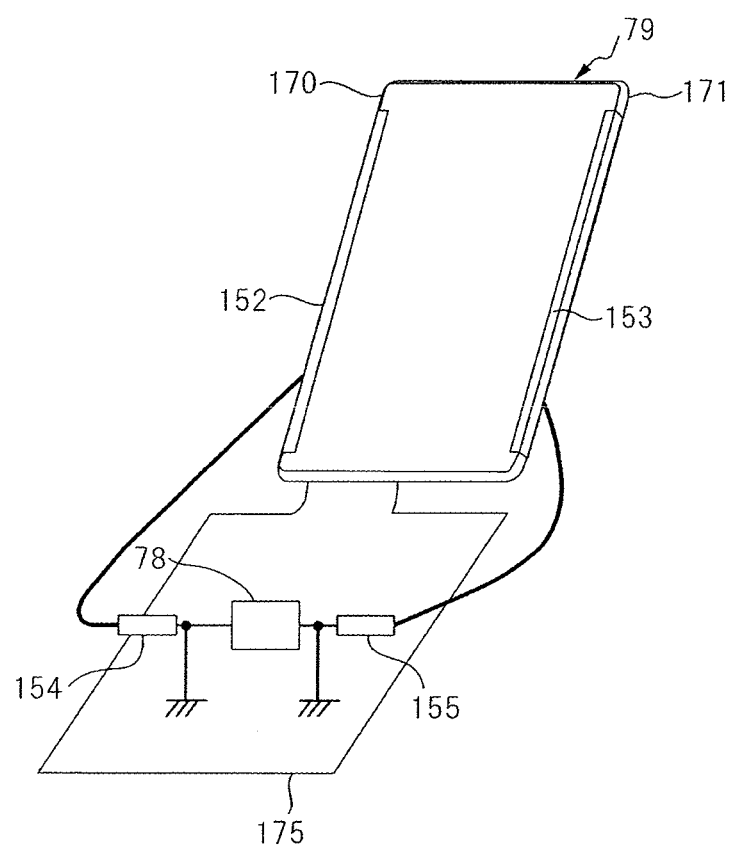
FIG. 14 is a perspective view showing the installation positions of two shield grounds and the connections between the two shield grounds and variable resistors in the portable electronic apparatus shown in FIG. 13.

The shield grounds 152 and 153 are provided on two opposed sides of the touch panel unit 77. FIG. 14 is a perspective view showing the installation positions of the shield grounds 152 and 153 and the connections between the shield grounds 152 and 153 and the variable resistors 154 and 155. In the figure, the shield grounds 152 and 153 are provided on two opposed sides 170 and 171 of a touch panel unit 79. In other words, the shield ground (first conductive member) 152 is provided on one (first side) of the two longitudinal sides of the touch panel unit 79 formed into a rectangular shape, and the shield ground (second conductive member) 153 is provided on the other side (second side) of the two sides.

One terminal of the variable resistor (first variable resistor) 154 is connected to the shield ground 152, and one terminal of the variable resistor (second variable resistor) 155 is connected to the shield ground 153. The other terminals of the variable resistors 154 and 155 are electrically connected to a predetermined potential. In this embodiment, the predetermined potential is set to the potential (ground potential) of the ground pattern on a circuit board 175. Operation stability is achieved by grounding the other terminals of the variable resistors 154 and 155 to the same ground as that of the touch panel controller 78.

Figure 15:
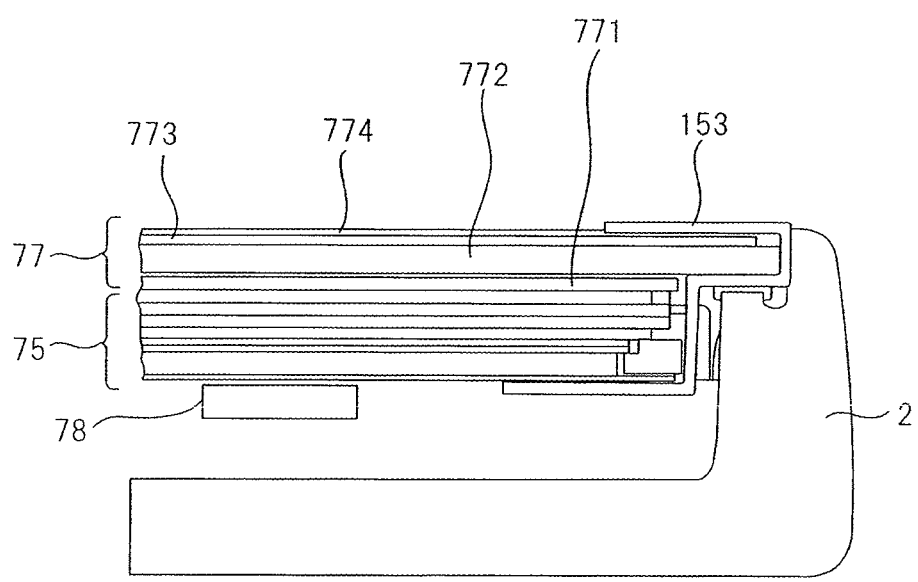
FIG. 15 is a sectional view showing a portion in which the shield ground is disposed in the housing of the portable electronic apparatus shown in FIG. 13.

FIG. 15 is a sectional view showing a portion in which the shield ground 153 is disposed in the housing 2. In the figure, the cross section of the shield ground 153 is formed into a shape so as to hold the peripheral portions of the display unit 75 and the touch panel unit 77 in the vertical direction. The shield ground 153 is disposed inside the housing 2 so as not to be directly touched with a human finger. Like the shield ground 153, the cross section of the shield ground 152 is formed into a shape so as to hold the peripheral portions of the display unit 75 and the touch panel unit 77 in the vertical direction, and the shield ground 152 is disposed inside the housing 2.

Since the touch panel unit 77 is provided with the shield grounds 152 and 153, the portions in which these are provided and their surrounding areas can be respectively shielded. In addition, the intensity degrees of the shield at the respective portions in which the shield grounds 152 and 153 are provided and the surrounding areas of the respective portions change depending on the resistance values of the variable resistors 154 and 155. As the resistance values of the variable resistors 154 and 155 are made smaller, the intensity degrees of the shield become larger, and the sensitivities at the respective portions in which the shield grounds 152 and 153 are provided and the surrounding areas of the respective portions become smaller. Hence, when the portions in which the shield grounds 152 and 153 of the touch panel unit 77 are provided are gripped with a hand, the influence of the holding hand can be suppressed by making the resistance values of the variable resistors 154 and 155 smaller.

In FIG. 15, the touch panel controller 78 is disposed just below the display unit 75. The touch panel unit 77 includes a proximity touch panel sensor 771, a cover glass 772, a thickener 773 and a scattering preventing film 774.

The apparatus control unit 151 and the touch panel controller 78 each includes a CPU, a ROM, a ROM and an interface circuit. Programs for controlling the CPU are stored in the ROM, and the RAM is used for the operation of the CPU.

Returning to FIG. 13, on the basis of the coordinate signal obtained by proximity detection using the touch panel module 73, the holding hand detection unit 162 judges whether the portable electronic apparatus 150 has been gripped by the user. In this case, when the user grips the portable electronic apparatus 150, the coordinate signal of the peripheral portion of the touch panel unit 77 is output from the touch panel controller 78, and the holding hand detection unit 162 receives the coordinate signal and judges that the portable electronic apparatus 150 has been gripped by the user.

Figure 16:
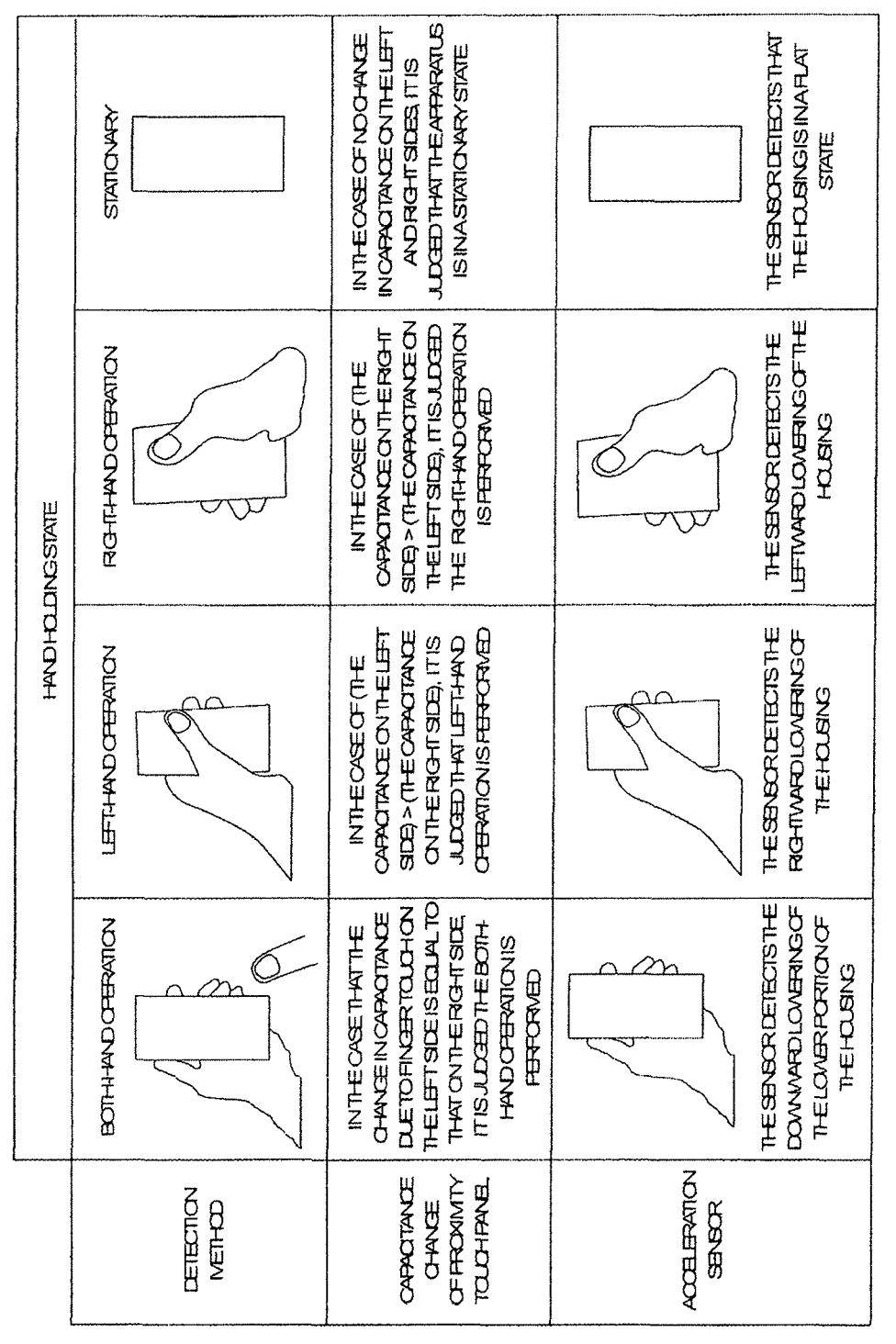

FIG. 16 is a view showing an example of a method for detecting hand holding states. In the figure, in addition to the proximity detection using the touch panel module 73, detection using an acceleration sensor can be performed for the detection of the hand holding states. The proximity detection using the touch panel module 73 is based on the change in capacitance; in the case that the change in capacitance due to finger touch on the left side is equal to that on the right side, it is judged that the apparatus is operated with both hands; in the case that the change in capacitance on the left side is larger than that on the right side, it is judged that the apparatus is operated with the left hand; in the case that the change in capacitance on the right side is larger than that on the left side, it is judged that the apparatus is operated with the right hand;

and in the case of no change in capacitance on the left and right sides, it is judged that the apparatus is in a stationary state.

Figure 17:
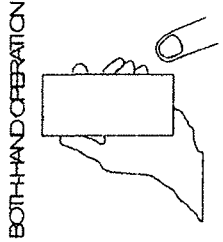
FIG. 17 is a view showing the hand holding states (that is, gripping states) of the portable electronic apparatus shown in FIG. 3 and examples of the resistance values of the variable resistors.

In the case that the holding hand detection unit 162 has judged that the portable electronic apparatus 150 has been gripped by the user, the detection unit sets the resistance values of the variable resistors 154 and 155. FIG. 17 is a view showing the hand holding states (that is, gripping states) of the portable electronic apparatus 150 and examples of the resistance values of the variable resistors 154 and 155. In the figure, in the case of both-hand operation, the variable resistors 154 and 155 are each set to 1 MΩ. In the case of left-hand operation, the variable resistor 154 is set to 0Ω and the variable resistor 155 is set to 1 MΩ. In the case of right-hand operation, the variable resistor 154 is set to 1 MΩ and the variable resistor 155 is set to 0Ω. In the case of the stationary state (the portable electronic apparatus 150 is not gripped, but placed on a desk or the like), the variable resistors 154 and 155 are each set to high impedance.

When the resistance values of the variable resistors 154 and 155 are reduced, the levels of the shield grounds 152 and 153 become close to the ground level, whereby the shield effect thereof is enhanced and the response of the touch panel unit 77 becomes slow. In other words, when the resistance values of the variable resistors 154 and 155 are reduced, the shield effect of the shield grounds 152 and 513 is enhanced and the hover distance of the apparatus (the distance between the touch panel unit 77 and a finger) becomes short.

In the case of left-hand operation, since the left thumb affects the touch panel unit 77, the resistance value of the variable resistor 154 on the left side is reduced (for example, 0Ω) to suppress the hover distance at the left side portion of the touch panel unit 77. In other words, the response at the left side portion of the touch panel unit 77 is made slow. The resistance value of the variable resistor 155 on the right side is set to an intermediate value (for example, 1 MΩ) so that the operation using the tip end of the left thumb can be performed to some extent. In the case of right-hand operation, since the right thumb affects the touch panel unit 77, the resistance value of the variable resistor 155 on the right side is reduced (for example, 0Ω) to suppress the hover distance at the right side portion of the touch panel unit 77. In other words, the response at the right side portion of the touch panel unit 77 is made slow. The resistance value of the variable resistor 154 on the left side is set to an intermediate value (for example, 1 MΩ) so that the operation using the tip end of the right thumb can be performed to some extent. In the case of both-hand operation, the resistance values of the variable resistors 154 and 155 on the left and right sides are each set to an intermediate value (for example, 1 MΩ) to suppress the influence due to the gripping of the portable electronic apparatus 150. In the case of the stationary state, since the portable electronic apparatus 150 is not affected by the fingers gripping the apparatus, the variable resistors 154 and 155 on the left and right sides are each set to high impedance to enhance the hover distance to the shield grounds 152 and 153 and the surrounding areas thereof.

The resistance values of the variable resistors 154 and 155 in various modes of the holding hand may preferably be set as described below.

(1) In a predetermined operation state, the resistance value of the variable resistor 154 is set to a first resistance value, and the resistance value of the variable resistor 155 is set to a second resistance value larger than the first resistance value.

This corresponds to an operation state in which the portable electronic apparatus 150 is gripped with the right hand and the touch panel unit 77 is operated with the right thumb, for example, or the portable electronic apparatus 150 is gripped with the left hand and the touch panel unit 77 is operated with the left thumb, for example. The first resistance value is "small" and may be 0Ω. The second resistance value is "intermediate" and is 1 MΩ, for example.

(2) The predetermined operation state is set to a first operation state, and in a second operation state, the resistance value of the variable resistor 154 is set to the second resistance value, and the resistance value of the variable resistor 155 is set to the first resistance value.

Since the resistance values of the variable resistors 154 and 155 are changed as the operation state is switched between the first operation state and the second operation state, the influence of the operation state on the touch panel unit 77 can be suppressed, regardless of whether the operation state is the first or second operation state. When the resistance value of the variable resistor 154 is set to the second resistance value, the resistance value may be slightly different from the second resistance value. Furthermore, when the resistance value of the variable resistor 155 is set to the first resistance value, the resistance value may be slightly different from the first resistance value.

(3) The predetermined operation state is set to a first operation state, and in a second operation state, the resistance value of the variable resistor 154 is set to a third resistance value, and the resistance value of the variable resistor 155 is set to a fourth resistance value smaller than the third resistance value.

The third resistance value is "intermediate" and is 1.1 MΩ, for example. The second resistance value and the third resistance value may be substantially the same. In addition, the fourth resistance value is "small" and is 0.1 MΩ, for example. The first resistance value and the fourth resistance value may be substantially the same.

(4) The predetermined operation state is set to a first operation state, and in a third operation state, the resistance value of the variable resistor 154 and the resistance value of the variable resistor 155 are set to the second resistance value.

The portable electronic apparatus 150 is gripped with the right hand and the touch panel unit 77 is operated with the left hand, or vice versa.

(5) This is a variation of (4); the predetermined operation state is set to a first operation state, and in a third operation state, the resistance value of the variable resistor 154 is set to a fifth resistance value, and the resistance value of the variable resistor 155 is set to a sixth resistance value, that is, a predetermined magnification of the fifth resistance value.

The fifth resistance value is 0.9 MΩ, for example, and the sixth resistance value is 0.98 MΩ, for example, and is substantially equal to the second resistance value. It is supposed that the difference therebetween is small, and the fifth resistance value and the sixth resistance value are each larger than the first resistance value as a matter of course. The predetermined magnification is a magnification between 0.5 and 2, for example.

(6) In a fourth operation state, the resistance value of the variable resistor 154 is set to a seventh resistance value at least larger than the second resistance value, and the resistance value of the variable resistor 155 is set to the seventh resistance value.

This state is the stationary state, and the seventh resistance value is "large" including high impedance (shutoff).

The magnitude relations of the second resistance value, the third resistance value, the fourth resistance value, the fifth resistance value, the sixth resistance value and the seventh resistance value described above are the second resistance value<the seventh resistance value, the third resistance value<the seventh resistance value, the fourth resistance value<the seventh resistance value, the fifth resistance value<the seventh resistance value, and the sixth resistance value<the seventh resistance value.

Even if the resistance value is slightly different from the seventh resistance value, the resistance value may preferably be high to the extent that the resistance value is assumed to be high impedance.

(7) In a fourth operation state, the resistance value of the variable resistor 154 is set to a seventh resistance value at least larger than the second resistance value, and the resistance value of the variable resistor 155 is set to an eighth resistance value at least larger than the second resistance value.

The seventh and eighth resistance values are "large" and are 10 GΩ, for example. The magnitude relations of the second resistance value, the third resistance value, the fourth resistance value, the fifth resistance value, the sixth resistance value and the eighth resistance value are the second resistance value<the eighth resistance value, the third resistance value<the eighth resistance value, the fourth resistance value<the eighth resistance value, the fifth resistance value<the eighth resistance value, and the sixth resistance value<the eighth resistance value.

Next, the operation of the portable electronic apparatus 150 according to this embodiment will be described.

Figure 18:
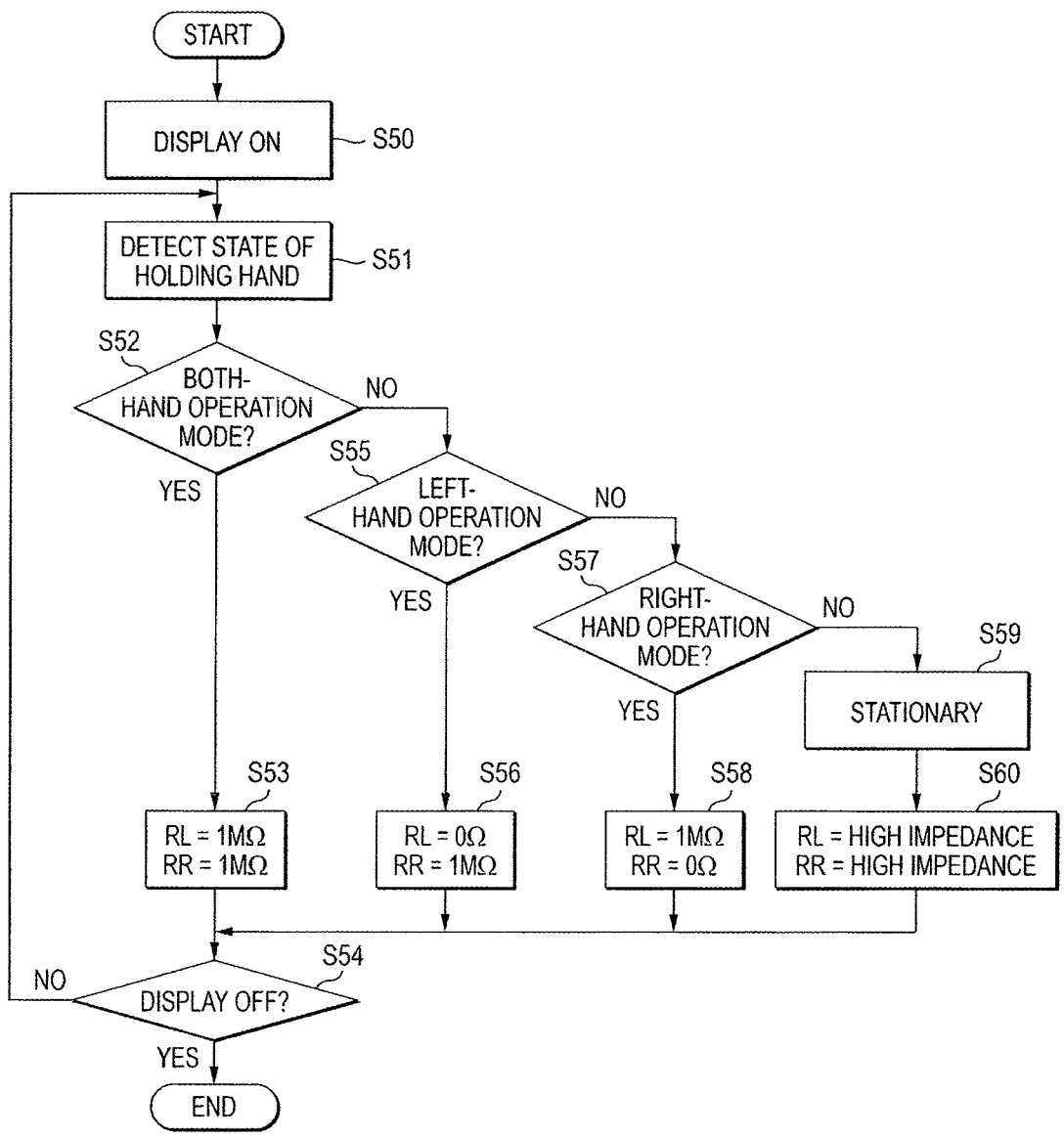
FIG. 18 is a flow chart illustrating the holding hand detection process of the portable electronic apparatus shown in FIG. 13.

FIG. 18 is a flow chart illustrating the holding hand detection process of the portable electronic apparatus 150 according to this embodiment. The process is performed when the display of the portable electronic apparatus 150 is ON. More specifically, the process is performed in a period from power ON and display ON to power-saving mode activation and display OFF. Display ON/OFF control is performed by the display processing unit 161.

In FIG. 18, the display processing unit 161 first turns ON the display (at step S50). After display ON, the holding hand detection unit 162 detects the state of the holding hand (at step S51) and judges whether the state is a both-hand operation mode (at step S52). In the case that the state is the both-hand operation mode (in the case that the judgment at step S52 is "YES"), the holding hand detection unit 162 sets each of the variable resistors 154 and 155 to 1 MΩ (at step S53). After the holding hand detection unit 162 has set each of the variable resistors 154 and 155 to 1 MΩ, the display processing unit 161 judges whether the display is OFF (at step S54); in the case that the display is OFF, this process is ended, and in the case that the display is not OFF, the process returns to step S51.

In the case that the holding hand detection unit 162 has judged at step S52 that the state is not the both-hand operation mode (in the case that the judgment at step S52 is "NO"), the holding hand detection unit 162 judges whether the state is a left-hand operation mode (at step S55). In the case that the state is the left-hand operation mode (in the case that the judgment at step S55 is "YES"), the holding hand detection unit 162 sets the variable resistor 154 to 0Ω and sets the variable resistor 155 to 1 MΩ (at step S56). After the variable resistor 154 has been set to 0Ω and the variable resistor 155 has been set to 1 MΩ, the display processing unit 161 judges whether the display is OFF (at step S54); in the case that the display is OFF, this process is ended, and in the case that the display is not OFF, the process returns to step S51.

In the case that the holding hand detection unit 162 has judged at step S55 that the state is not the left-hand operation mode (in the case that the judgment at step S55 is "NO"), the holding hand detection unit 162 judges whether the state is a right-hand operation mode (at step S57). In the case that the state is the right-hand operation mode (in the case that the judgment at step S57 is "YES"), the holding hand detection unit 162 sets the variable resistor 154 to 1 MΩ and sets the variable resistor 155 to 0Ω (at step S58). After the variable resistor 154 has been set to 1 MΩ and the variable resistor 155 has been set to 0Ω, the display processing unit 161 judges whether the display is OFF (at step S54); in the case that the display is OFF, this process is ended, and in the case that the display is not OFF, the process returns to step S51.

In the case that the holding hand detection unit 162 has judged at step S57 that the state is not the right-hand operation mode (in the case that the judgment at step S57 is "NO"), the holding hand detection unit 162 judges that the state is the stationary state (at step S59) and sets each of the variable resistors 154 and 155 to high impedance far exceeding 1 MΩ (at step S60). After the holding hand detection unit 162 has set each of the variable resistors 154 and 155 to the high impedance, the display processing unit 161 judges whether the display is OFF (at step S54); in the case that the display is OFF, this process is ended, and in the case that the display is not OFF, the process returns to step S51.

As describe above, the portable electronic apparatus 150 according to this embodiment has the shield grounds 152 and 153 provided on the two opposed sides 170 and 171 in the longitudinal direction of the touch panel unit 77 having a rectangular shape and stacked and disposed on the display unit 75; the variable resistor 154, one terminal of which is connected to the shield ground 152 and the other terminal of which is connected to the ground pattern on the circuit board 175, the variable resistor 155, one terminal of which is connected to the shield ground 153 and the other terminal of which is connected to the ground pattern on the circuit board 175, and the holding hand detection unit 162 for judging whether the portable electronic apparatus 150 has been gripped by the user on the basis of the coordinate signal obtained by the proximity detection using the touch panel module 73 and for setting the resistance values of the variable resistors 154 and 155 in the case that the portable electronic apparatus 150 has been gripped by the user; the holding hand detection unit 162 sets the resistance value of each of the variable resistors 154 and 155 to "intermediate" in the case of both-hand operation, sets the resistance value of the variable resistor 154 to "small" and the resistance value of the variable resistor 155 to "intermediate" in the case of left-hand operation, sets the resistance value of the variable resistor 154 to "intermediate" and the resistance value of the variable resistor 155 to "small" in the case of right-hand operation, and sets the resistance value of each of the variable resistors 154 and 155 to "high impedance" in the case of the stationary state; hence, the influence of the holding hand on the portable electronic apparatus 150 (that is, malfunction caused by the reaction of the touch panel unit 77) can be suppressed.

In the portable electronic apparatus 150 according to this embodiment, although the program describing the process shown in the flow chart of FIG. 18 is stored in the ROM, the program may be stored in a storage medium, such as a magnetic disk, an optical disk, a magneto-optical disk or a flash memory and delivered, or may be stored in a server (not shown) on a network, such as the Internet so that the program can be downloaded using electric communication lines.

Figure 19:
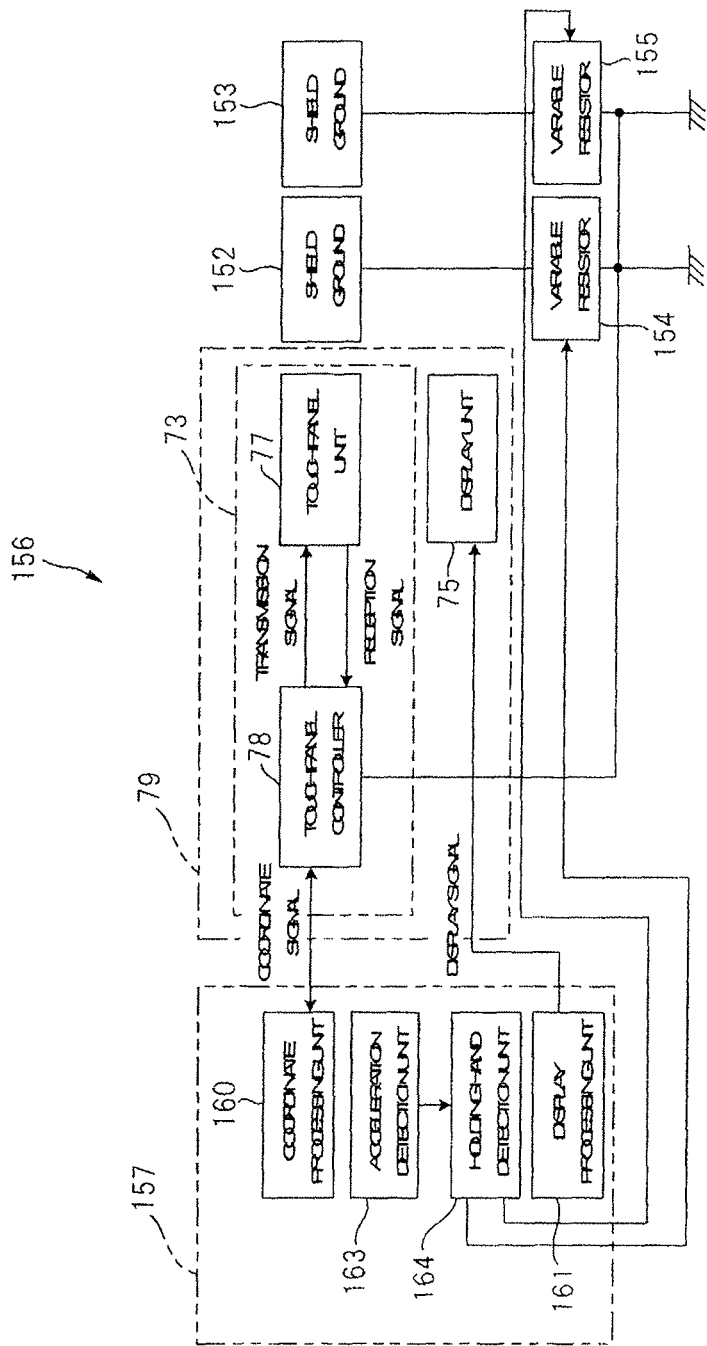
FIG. 19 is a block diagram showing an outline configuration of a portable electronic apparatus in which the state of the holding hand is detected using an acceleration sensor.

FIG. 19 is a block diagram showing an outline configuration of a portable electronic apparatus 156 in which the state of the holding hand is detected using an acceleration sensor. In the figure, portions common to those shown in FIG. 13 are designated by the same numerals and their descriptions are omitted. The portable electronic apparatus 156 in which the state of the holding hand is detected by acceleration has an apparatus control unit 157. The apparatus control unit 157 is equipped with a coordinate processing unit 160, a display processing unit 161, an acceleration detection unit 163 and a holding hand detection unit 164. The acceleration detection unit 163 has an acceleration sensor (not shown) and outputs the acceleration detected by the acceleration sensor to the holding hand detection unit 164. Concerning holding hand state detection using the acceleration sensor, refer to FIG. 16. The holding hand detection unit 164 detects the hand holding the portable electronic apparatus 150 of the user from the output of the acceleration detection unit 163 and switches the resistance values of the variable resistors 154 and 155. The setting of the resistance values of the variable resistors 154 and 155 in the various modes of the holding hand is as described above.

Embodiment 3

Figure 20:
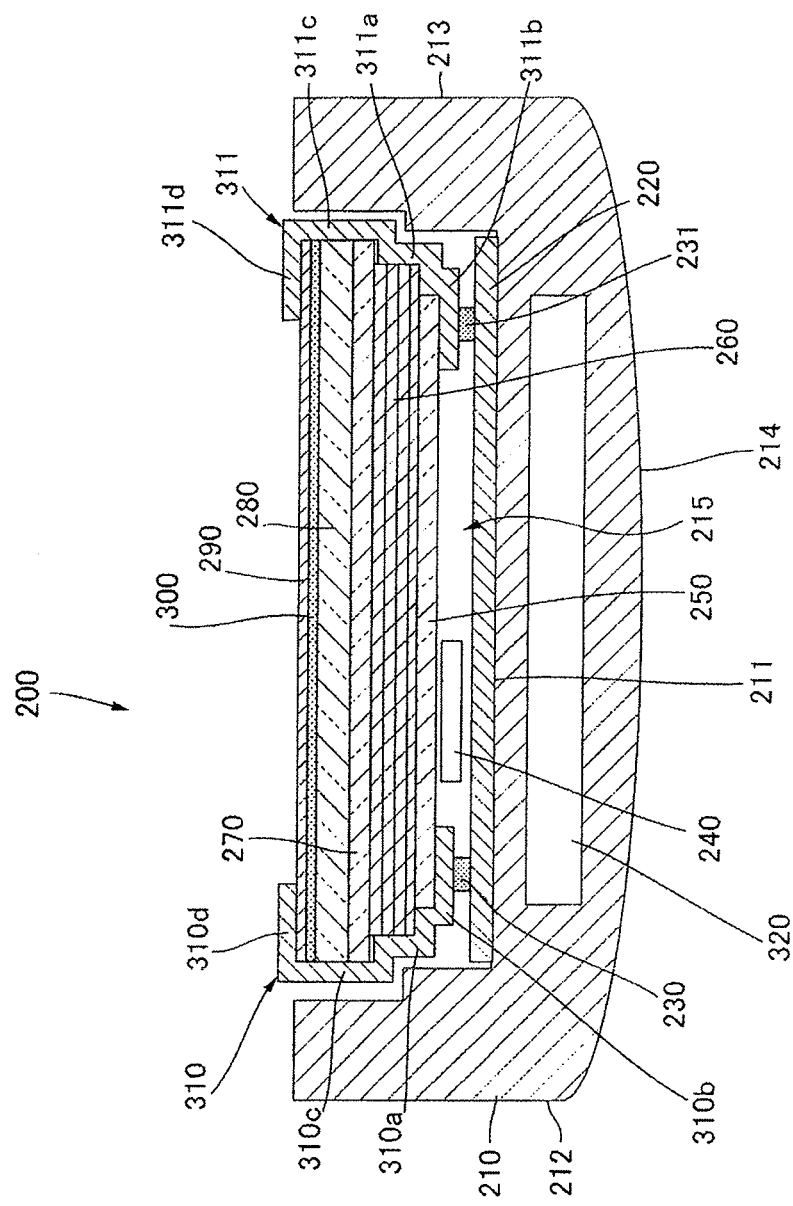
FIG. 20 is a side sectional view showing a portable electronic apparatus according to Embodiment 3 of the present invention, the center portion of which is cut in the short direction thereof.

FIG. 20 is a side sectional view showing a portable electronic apparatus according to Embodiment 3 of the present invention, the center portion of which is cut in the short direction thereof. However, since the portable electronic apparatus according to this embodiment is a portable radio apparatus referred to as a smart phone similar to the portable electronic apparatus 1 according to the above-mentioned Embodiment 1 and the outline thereof is similar to those of such apparatuses, the outline view thereof is omitted, and FIG. 1 is applied by analogy as necessary for explanation.

In FIG. 20, the portable electronic apparatus 200 according to this embodiment has a housing 210, an insert sheet metal 220, conductive cushions 230 and 231, a touch panel controller 240, a backlight 250, a liquid crystal display unit 260, a touch panel unit 270, a cover glass 280, a scattering preventing film 290, a thickener 300, shield grounds 310 and 311, and a battery 320. The insert sheet metal 220 corresponds to a seventh conductive member. In addition, the backlight 250 and the liquid crystal display unit 260 constitute a display unit. Furthermore, the touch panel unit 270 corresponds to a touch panel. Besides, the conductive cushions 230 and 231 correspond to contact units. Moreover, the battery 320 corresponds to a battery. In the case that an organic EL display is used for the display unit, the backlight 250 is not necessary.

The housing 210 is formed into a concave shape in cross section and has a flat first face 211, first and second side faces 212 and 213 rising from both sides of the first face 211, and a rounded second face (the bottom face of the portable electronic apparatus 200) 214 that is nearly parallel with the first face 211 and raised at the center portion. In this case, the first and second side faces 212 and 213 are connected to the second face 214. In addition, the first side face 212, the first face 211 and the second side face 213 constitute the concave part 215, and in the concave part 215, the insert sheet metal 220, the conductive cushions 230 and 231, the touch panel controller 240, the backlight 250, the liquid crystal display unit 260, the touch panel unit 270, the cover glass 280, the scattering preventing film 290, and the shield grounds 310 and 311 are accommodated. Furthermore, the portions of the first and second side faces 212 and 213 on the sides of the concave part 215 are formed into a one-step staircase shape.

The insert sheet metal 220 is formed so that its short-direction (the direction perpendicular to the direction as viewed toward the drawing) dimension is slightly shorter than the short-direction dimension of the first face 211 of the housing 210 corresponding to the bottom face of the concave part 215 and is disposed on the first face 211. The conductive cushions 230 and 231 have both cushioning property and conductivity by making a multilayered urethane substrate electrically conductive, for example. The conductive cushions 230 and 231 are disposed on the insert sheet metal 220 so as to be separated from each other in the short direction thereof. In this case, the conductive cushions 230 and 231 are electrically connected to the insert sheet metal 220. Furthermore, the conductive cushions 230 and 231 are electrically connected to the shield grounds 310 and 311 as described later.

The backlight 250, the liquid crystal display unit 260, the touch panel unit 270, the cover glass 280 and the scattering preventing film 290 are stacked and disposed in the order of the backlight 250, the liquid crystal display unit 260, the touch panel unit 270, the cover glass 280 and the scattering preventing film 290. In this case, the backlight 250 is disposed lowermost and the scattering preventing film 290 is disposed uppermost as a matter of course. The touch panel controller 240 has a function similar to those of the touch panel controller 8 of the portable electronic apparatus 1 according to the above-mentioned Embodiment 1 and the touch panel controller 78 of the portable electronic apparatus 150 according to the above-mentioned Embodiment 2. The liquid crystal display unit 260 is similar to the liquid crystal display unit 4 of the portable electronic apparatus 1 according to the above-mentioned Embodiment 1 and displays screens for operating the portable electronic apparatus 200, images, etc. The touch panel unit 270 is similar to the touch panel unit 5 of the portable electronic apparatus 1 according to the above-mentioned Embodiment 1 and the touch panel unit 77 of the portable electronic apparatus 150 according to the above-mentioned Embodiment 2. The cover glass 280 protects the touch panel unit 270, and the scattering preventing film 29 protects the cover glass 280 by preventing glass pieces from scattering when the cover glass 280 is broken. The scattering preventing film 29 is secured to the cover glass 280 using the thickener 300.

The touch panel unit 270, the cover glass 280 and the scattering preventing film 290 are all formed in the same size although different in thickness. In this case, the touch panel unit 270 is formed so that its short-direction (the direction perpendicular to the direction as viewed toward the drawing) dimension is slightly shorter than the short-direction dimension of the opening end of the housing 210 and so that the touch panel unit can be accommodated inside the concave part 215 of the housing 210. Like the touch panel unit 270, the cover glass 280 and the scattering preventing film 290 are also formed so that their short-direction (the direction perpendicular to the direction as viewed toward the drawing) dimensions are slightly shorter than the short-direction dimension of the opening end of the housing 210 and so that the cover glass and the scattering preventing film can be accommodated inside the concave part 215 of the housing 210. The liquid crystal display unit 260 is formed so that its short-direction dimension is slightly shorter than the short-direction dimensions of the touch panel unit 270, the cover glass 280 and the scattering preventing film 290, and the backlight 250 is formed so that its short-direction dimension is slightly shorter than the short-direction dimension of the liquid crystal display unit 260. The touch panel controller 240 is provided inside the concave part 215 of the housing 210 and between the insert sheet metal 220 and the backlight 250.

The shield grounds 310 and 311 are disposed so as to hold the peripheral edges of the laminated structure of the backlight 250, the liquid crystal display unit 260, the touch panel unit 270, the cover glass 280 and the scattering preventing film 290 in the vertical direction and so as to be located along the two opposed sides in the short direction of the laminated structure and to make contact with the respective end parts of the laminated structure. In this case, the shield ground 310 is disposed at the end part on the left side of the drawing as viewed toward the drawing, and the shield ground 311 is disposed at the end part on the right side. Furthermore, since the short-direction dimension of the touch panel unit 270, the cover glass 280 and the scattering preventing film 290, the short-direction dimension of the liquid crystal display unit 260 and the short-direction dimension of the backlight 250 in the laminated structure are different from one another, the portions of the shield grounds 310 and 311, except the upper end portions 310d and 311d thereof, have a nearly staircase shape in cross section and make close contact with the respective end parts of the laminated structure. In this case, the shield grounds 310 and 311 may be secured to all the end parts of the laminated structure or to at least both the end parts of the liquid crystal display unit 260.

The upper end portions 310d and 311d of the shield grounds 310 and 311 are bent inward so as to make contact with the surface of the scattering preventing film 290. Furthermore, as described above, the shield ground 310 is electrically connected to the conductive cushion 230, and the shield ground 311 is electrically connected to the conductive cushion 231. Since the conductive cushions 230 and 231 are electrically connected to the insert sheet metal 220, the shield grounds 310 and 311 are electrically connected to each other via the conductive cushions 230 and 231 and the insert sheet metal 220. Since the conductive cushions 230 and 231 are made of, for example, an easily deformable multilayered urethane substrate, the laminated structure of the backlight 250, the liquid crystal display unit 260, the touch panel unit 270, the cover glass 280 and the scattering preventing film 290 can move with respect to the insert sheet metal 220. In other words, the laminated structure can move in a direction nearly parallel with the first face 211 or the bottom face of the liquid crystal display unit 260.

The portion 310a of the shield ground 310 making contact with the end part of the liquid crystal display unit 260 corresponds to a first conductive member, the portion 310b thereof making contact with the bottom face of the backlight 250 corresponds to a third conductive member, and the portion 310c thereof making contact with the touch panel unit 270 corresponds to a fifth conductive member. Furthermore, the portion 311a of the shield ground 311 making contact with the end part of the liquid crystal display unit 260 corresponds to a second conductive member, the portion 311b thereof making contact with the bottom face of the backlight 250 corresponds to a fourth conductive member, and the portion 311c thereof making contact with the touch panel unit 270 corresponds to a sixth conductive member.

Each of the first conductive member 310a, the second conductive member 311a, the third conductive member 310b, the fourth conductive member 311b, the fifth conductive member 310c and the sixth conductive member 311c can be used as a single independent shield ground.

The shield grounds 310 and 311 are made of metal or graphite. In this case, when it is assumed that the shield grounds 310 and 311 serve as the first conductive member 310a, the second conductive member 311a, the third conductive member 310b, the fourth conductive member 311b, the fifth conductive member 310c and the sixth conductive member 311c, at least one of the conductive members 310a, 311a, 310b, 311b, 310c and 311c is made of metal or graphite. Furthermore, the insert sheet metal 220 is also made of metal or graphite.

Since the shield grounds 310 and 311 are integrated with the touch panel unit 270 in the portable electronic apparatus 200 according to this embodiment, even if the main body of the apparatus is gripped strongly with a hand, the paths of the electric lines of force between the transmission electrodes and the reception electrodes of the touch panel unit 270 are unchanged because the touch panel unit 270 is moved together with the shield grounds 310 and 311 (in other words, the relative positional relation between the touch panel unit 270 and the shield grounds 310 and 311 is maintained constant). Hence, erroneous coordinate signals are not output, and the performance of the touch panel as a touch panel can be ensured.

The battery 320 is accommodated in the inside space between the first face 211 and the second face 214 of the housing 210, and the portable electronic apparatus 200 operates on the power source from the battery 320.

Since the portable electronic apparatus 200 according to this embodiment has the shield grounds 310 and 311 formed so as to make contact with the end parts of the laminated structure of the backlight 250, the liquid crystal display unit 260, the touch panel unit 270, the cover glass 280 and the scattering preventing film 290 along the two opposed sides in the short direction of the laminated structure as described above, even if the main body of the apparatus is gripped strongly with a hand, the paths of the electric lines of force between the transmission electrodes and the reception electrodes of the touch panel unit 270 are unchanged because the touch panel unit 270 is moved together with the shield grounds 310 and 311. Hence, erroneous coordinate signals are not output, and the performance of the touch panel as a touch panel can be ensured.

Although the portable electronic apparatus 200 according to this embodiment is assumed to be a portable radio apparatus referred to as a smart phone, the apparatus may be a tablet terminal. In the case that the apparatus is assumed to be a portable radio apparatus referred to as a smart phone, the apparatus can be gripped with one hand; however, in the case that the apparatus is assumed to be a tablet terminal, although the apparatus can be held or supported with one hand, the apparatus is used with both hands in actual practice.

Furthermore, in the case that no operation is performed for a predetermined time in the portable electronic apparatus, the operation mode thereof can be shifted to a power-saving mode (for example, the liquid crystal backlight thereof is turned off or the brightness of the organic EL display thereof is lowered). In the case that the operation mode is shifted as described above, if the state of the electric lines of force at the time when the portable electronic apparatus is merely gripped with a hand is judged that the apparatus is operated, the operation mode cannot be shifted to the power-saving mode, and the operable time of the battery becomes short.

In the portable electronic apparatus 200 according to this embodiment, the shield grounds 310 and 311 disposed at the end parts of the touch panel unit 270 absorb the leakage of the electric lines of force at the end parts, thereby suppressing the leakage of the electric lines of force from the end parts of the portable electronic apparatus 200. Hence, in the case that the portable electronic apparatus 200 is merely gripped, the portable electronic apparatus 200 can suppress the judgment that the apparatus is operated, whereby the operation mode can be efficiently shifted to the power-saving mode and the operable time of the battery can be made long.

Modification 1 of Embodiment 3

In the portable electronic apparatus 200 according to the above-mentioned Embodiment 3, although the structure of the shield grounds 310 and 311 is designed so as to hold the peripheral edges of the laminated structure of the backlight 250, the liquid crystal display unit 260, the touch panel unit 270, the cover glass 280 and the scattering preventing film 290 in the vertical direction, the shield grounds may have any structure, provided that the touch panel unit 270 is moved together with the shield grounds 310 and 311 at the time when the main body of the apparatus is gripped strongly with a hand.

Figure 21:
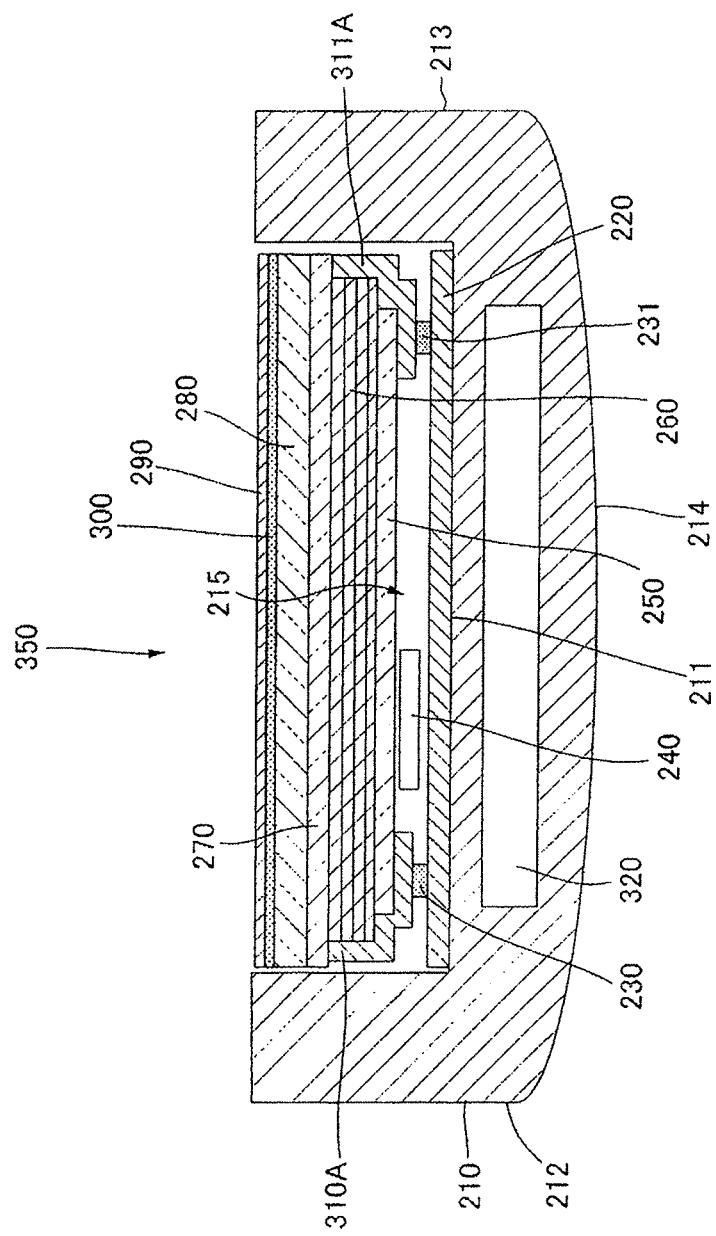
FIG. 21 is a side sectional view showing a portable electronic apparatus according to Modification 1 of the portable electronic apparatus according to Embodiment 3 of the present invention.

FIG. 21 is a side sectional view showing a portable electronic apparatus 350 according to Modification 1 of the portable electronic apparatus 200 according to Embodiment 3. As shown in the figure, shield grounds 310A and 311A according to Modification 1 are disposed so as to be located along the two opposed sides in the short direction of the backlight 250 and the liquid crystal display unit 260 and to make contact with the end parts of the backlight 250 and the end parts of the liquid crystal display unit 260. In this case, the shield grounds 310A and 311A are disposed so that the upper ends thereof make contact with the touch panel unit 270. Even in the case that the shield grounds 310A and 311A structured as described above are disposed so that the upper ends thereof make contact with the touch panel unit 270, the touch panel unit 270 is moved together with the shield grounds 310A and 311A at the time when the main body of the apparatus is gripped strongly with a hand, whereby the paths of the electric lines of force between the transmission electrodes and the reception electrodes of the touch panel unit 270 are unchanged. Hence, erroneous coordinate signals are not output, and the performance of the touch panel as a touch panel can be ensured.

Also in the portable electronic apparatus 350, the shield grounds 310A and 311A disposed at the end parts of the touch panel unit 270 absorb the leakage of the electric lines of force at the end parts, thereby suppressing the leakage of the electric lines of force from the end parts of the portable electronic apparatus 350. Hence, in the case that the portable electronic apparatus 350 is merely gripped, the portable electronic apparatus 350 can suppress the judgment that the apparatus is operated, whereby the operation mode can be efficiently shifted to the power-saving mode and the operable time of the battery can be made long.

However, since the shield grounds 310A and 311A do not make contact with the end parts of the touch panel unit 270, the cover glass 280 and the scattering preventing film 290, the first side face 212 and the second side face 213 on the sides of the concave part 215 of the housing 210 are not required to be formed into a staircase shape. In this application, the shape is made linear.

Modification 2 of Embodiment 3

Figure 22:
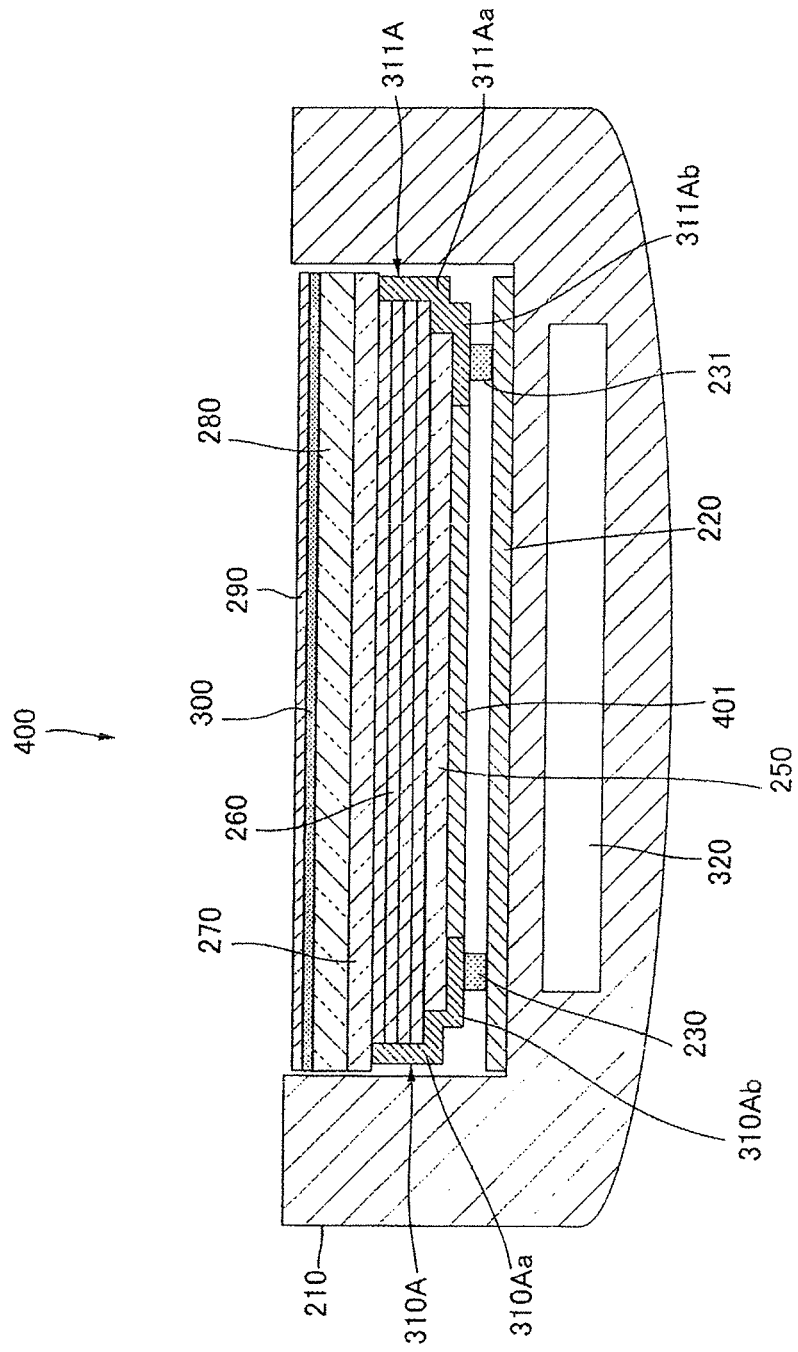
FIG. 22 is a side sectional view showing a portable electronic apparatus according to Modification 2 of the portable electronic apparatus according to Embodiment 3 of the present invention.

FIG. 22 is a side sectional view showing a portable electronic apparatus 400 according to Modification 2 of the portable electronic apparatus 200 according to Embodiment 3, the center portion of which is cut in the short direction thereof. As shown in the figure, the portable electronic apparatus 400 according to Modification 2 is equipped with an eighth conductive member 401 disposed along the bottom face of the backlight (display unit) 250 and electrically connected to a third conductive member 310Ab and a fourth conductive member 311Ab. The eighth conductive member 401 is formed into a planar shape.

In the portable electronic apparatus 200 according to the above-mentioned Embodiment 3 and the portable electronic apparatus 350 according to Modification 1 thereof, the insert sheet metal 220 is connected to the third conductive member 310Ab and the fourth conductive member 311Ab; however, in the portable electronic apparatus 400 according to Modification 2, the eighth conductive member 401 is provided in addition to the insert sheet metal 220, and the eighth conductive member 401 is connected to the third conductive member 310Ab and the fourth conductive member 311Ab. The eighth conductive member 401 may be integrated with the third conductive member 310Ab or may be integrated with the fourth conductive member 311Ab. Furthermore, the eighth conductive member may be integrated with the third conductive member 310Ab and the fourth conductive member 311Ab.

In the portable electronic apparatus 400 according to Modification 2, the insert sheet metal 220 acts to reinforce the liquid crystal display unit 260 as the original function thereof and also acts to support the laminated structure located above together with the conductive cushions from below. In the portable electronic apparatus 400 according to Modification 2, since the conductive cushions 230 and 231 are used to support the laminated structure located above together with the insert sheet metal 220, the conductive cushions may not be required to have conductivity.

The third conductive member 310Ab and a first conductive member 310Aa constitute the shield ground 310A, and the fourth conductive member 311Ab and a second conductive member 311Aa constitute the shield ground 311A. The shield grounds 310A and 311A are disposed so as to be located along the two opposed sides in the short direction of the backlight 250 and the liquid crystal display unit 260 and to make contact with the end parts of the backlight 250 and the end parts of the liquid crystal display unit 260.

Also in the portable electronic apparatus 400 according to Modification 2 structured as described above, the touch panel unit 270 is moved together with the shield grounds 310A and 311A at the time when the main body of the apparatus is gripped strongly with a hand, whereby the paths of the electric lines of force between the transmission electrodes and the reception electrodes of the touch panel unit 270 are unchanged, whereby erroneous coordinate signals are not output. Hence, the performance of the touch panel as a touch panel can be ensured.

Moreover, also in the portable electronic apparatus 400, the shield grounds 310A and 311A disposed at the end parts of the touch panel unit 270 absorb the leakage of the electric lines of force at the end parts, thereby suppressing the leakage of the electric lines of force from the end parts of the portable electronic apparatus 400. Hence, in the case that the portable electronic apparatus 400 is merely gripped, the portable electronic apparatus 400 can suppress the judgment that the apparatus is operated, whereby the operation mode can be efficiently shifted to the power-saving mode and the operable time of the battery can be made long.

In the portable electronic apparatus 400 according to Modification 2, the touch panel controller 240 is mounted on a separate flexible circuit board (not shown).

Modification 3 of Embodiment 3

Figure 23:
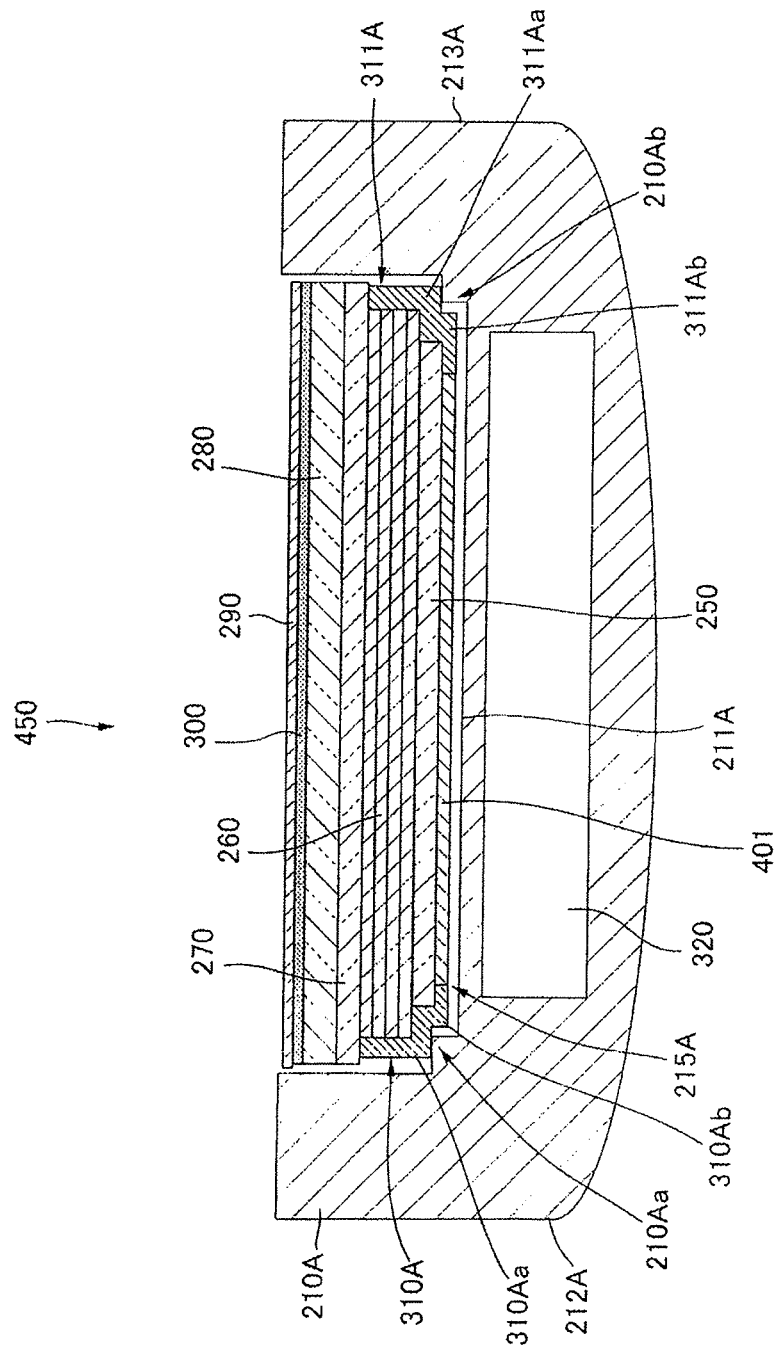
FIG. 23 is a side sectional view showing a portable electronic apparatus according to Modification 3 of the portable electronic apparatus according to Embodiment 3 of the present invention.

FIG. 23 is a side sectional view showing a portable electronic apparatus 450 according to Modification 3 of the portable electronic apparatus 200 according to Embodiment 3, the center portion of which is cut in the short direction thereof. As shown in the figure, the portable electronic apparatus 450 according to Modification 3 has a configuration and a structure similar to those of the portable electronic apparatus 400 according to the above-mentioned Modification 2, except that the shape of the housing is different. However, the insert sheet metal 220 and the conductive cushions 230 and 231 are not provided. The housing 210A of the portable electronic apparatus 450 according to Modification 3 has a size capable of accommodating the backlight 250, the liquid crystal display unit 260, the touch panel unit 270, the cover glass 280, the scattering preventing film 290, the shield grounds 310A and 311A and the eighth conductive member 401, and has a concave part 215A in which a support unit 210Aa and a support unit 210Ab for supporting the shield grounds 310A and 311A are respectively formed on both sides of a first face 211A. Since the concave part 215A does not accommodate the insert sheet metal 220, the conductive cushions 230 and 231 and the touch panel controller 240 having been present in the portable electronic apparatus 400 according to Modification 2, the concave part is formed so as to be shallower than that of the housing 210 of the portable electronic apparatus 400 according to Embodiment 2 by the volume saved.

The support units 210Aa and 210Ab are respectively formed in the longitudinal direction of the housing 210A; the support unit 210Aa supports the first conductive member 310Aa of the shield ground 310A and the support unit 210Ab supports the second conductive member 311Aa of the shield ground 311A. In the portable electronic apparatus 450 according to Modification 3, the two support units 210Aa and 210Ab formed on the first face 211A support the shield grounds 310A and 311A; however, at least one of the shield grounds 310A and 311A and the eighth conductive member 401 may merely be supported. In the case that only one of them is supported, the eighth conductive member 401 is supposed to be supported.

The liquid crystal display unit 260 can be reinforced without using the insert sheet metal 220 by integrally forming the shield ground 310A, the shield ground 311A and the eighth conductive member 401 and by further enhancing the strength of the integrated structure.

Also in the portable electronic apparatus 450 according to Modification 3 structured as described above, the touch panel unit 270 is moved together with the shield grounds 310A and 311A at the time when the main body of the apparatus is gripped strongly with a hand, whereby the paths of the electric lines of force between the transmission electrodes and the reception electrodes of the touch panel unit 270 are unchanged. Hence, erroneous coordinate signals are not output, and the performance of the touch panel as a touch panel can be ensured.

Also in the portable electronic apparatus 450, the shield grounds 310A and 311A disposed at the end parts of the touch panel unit 270 absorb the leakage of the electric lines of force at the end parts, thereby suppressing the leakage of the electric lines of force from the end parts of the portable electronic apparatus 450. Hence, in the case that the portable electronic apparatus 450 is merely gripped, the portable electronic apparatus 450 can suppress the judgment that the apparatus is operated, whereby the operation mode can be efficiently shifted to the power-saving mode and the operable time of the battery can be made long.

Embodiment 4

Figure 24:
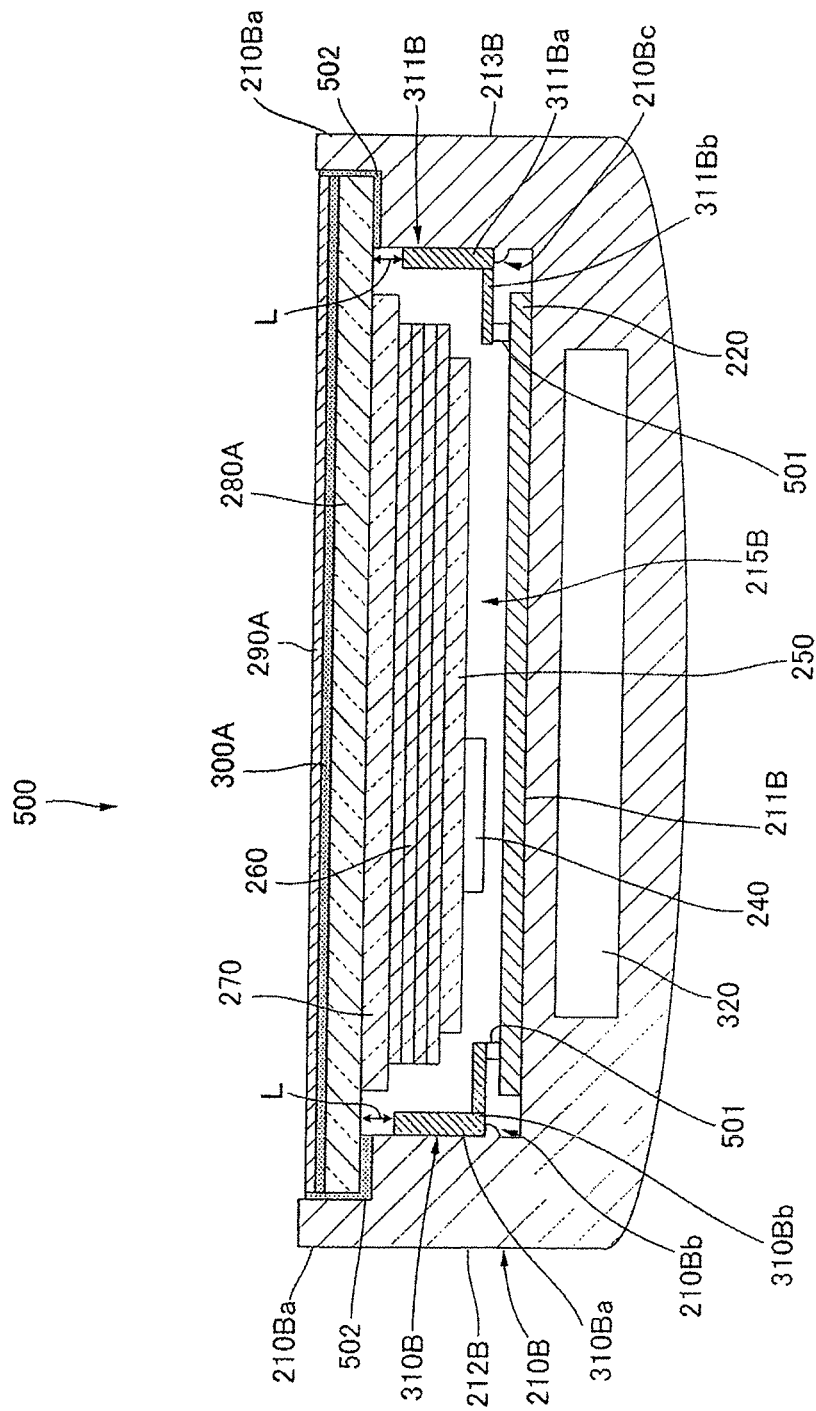
FIG. 24 is a side sectional view showing a portable electronic apparatus according to Embodiment 4 of the present invention, the center portion of which is cut in the short direction thereof.
Figure 25:
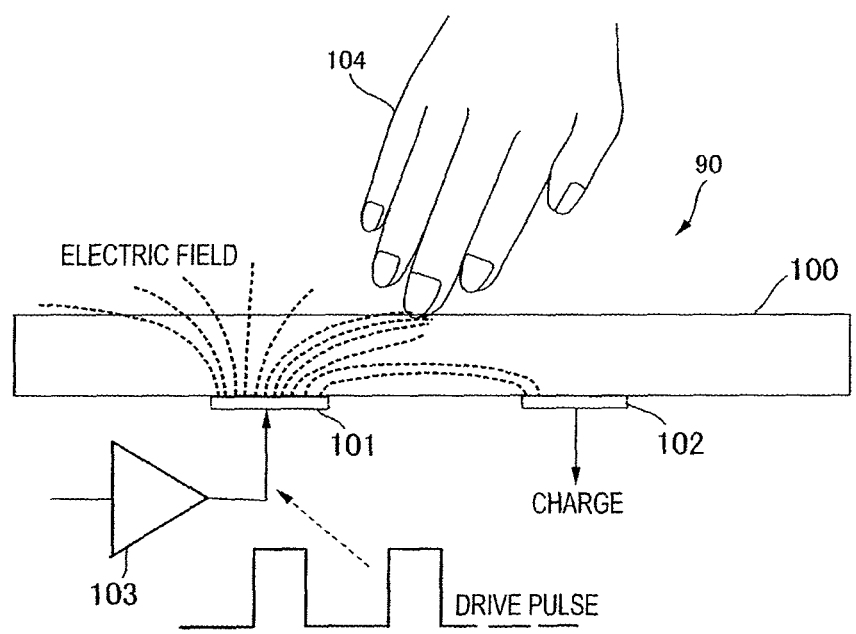
FIG. 25 is a view showing the basic configuration of an electrostatic capacitance type touch panel.
Figure 26:
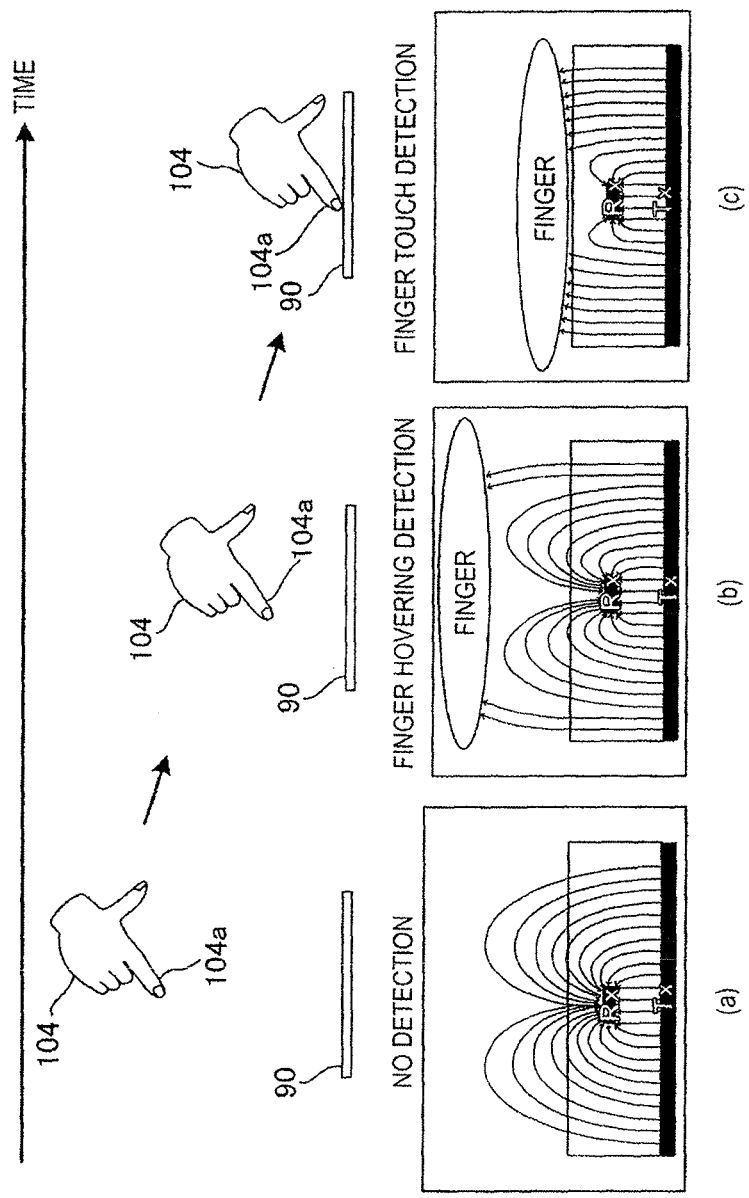
FIGS. 26(a) to 26(c) are views showing finger detection states at the time when a hand is gradually brought close to the touch panel.
Figure 27:
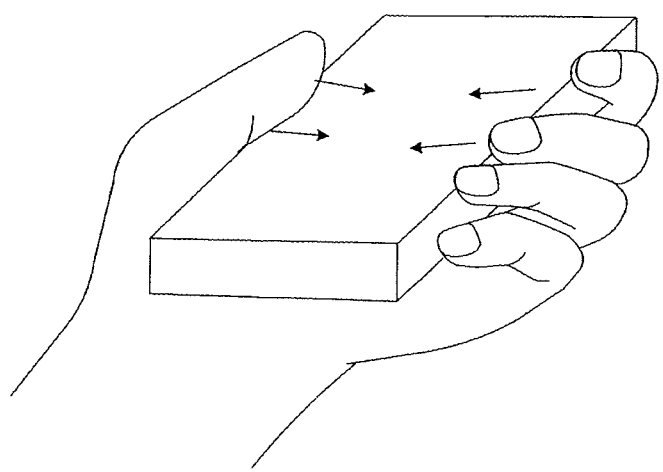
FIG. 27 is a view showing forces for pressing the housing of a portable electronic apparatus at the time when the apparatus is gripped with one hand.

FIG. 24 is a side sectional view showing a portable electronic apparatus according to Embodiment 4 of the present invention, the center portion of which is cut in the short direction thereof. However, since the portable electronic apparatus according to this embodiment is a portable radio apparatus referred to as a smart phone similar to the portable electronic apparatus 1 according to the above-mentioned embodiment 1 and the outline thereof is similar to those of such apparatuses, the outline view thereof is omitted, and FIG. 1 is applied by analogy as necessary for explanation. Furthermore, since the electrical configuration of the portable electronic apparatus according to this embodiment is similar to that shown in the above-mentioned FIG. 13, the description of the configuration is omitted.

Referring to FIG. 24, a portable electronic apparatus 500 according to this embodiment is different from the portable electronic apparatus 200 according to the above-mentioned Embodiment 3 in the following points:

(1) A cover glass 280A and a scattering preventing film 290A (including a thickener 300A) are larger than the laminated structure of the touch panel unit 270, the liquid crystal display unit 260 and the backlight 250.

(2) The upper end part 210Ba of the housing 210B is formed to be thin so as to be able to accommodate the cover glass 280A and the scattering preventing film 290A being large in size.

(3) Shield grounds 310B and 311B having an L shape in cross section are provided on the inner wall face of the housing 210B away from the liquid crystal display unit 260. The shield ground 310B is disposed on the side of the first side face 212B of the housing 210B, and the shield ground 311B is disposed on the side of the second side face 213B of the housing 210B. Like the shield grounds 152 and 153 of the portable electronic apparatus 150 according to the above-mentioned Embodiment 2, the shield grounds 310B and 311B are used to suppress the influence of the holding hand. Since the shield grounds 310B and 311B are away from the liquid crystal display unit 260, they are not moved together with the touch panel unit 270.

The shield ground 310B includes a first conductive member 310Ba making contact with the first side face 212B of the housing 210B and a third conductive member 310Bb disposed along the first face 211B of the housing and electrically connected to the first conductive member 310Ba. The shield ground 311B includes a second conductive member 311Ba making contact with the second side face 213B of the housing 210B and a fourth conductive member 311Bb disposed along the first face 211B and electrically connected to the fourth conductive member 311Bb. The shield grounds 310B and 311B are made of sheet metal. The first side face 212B, the first face 211B and the second side face 213B constitute a concave part 215B. In the shield ground 310B, the first conductive member 310Ba and the third conductive member 310Bb may be integrated with each other. Furthermore, In the shield ground 311B, the second conductive member 311Ba and the fourth conductive member 311Bb may be integrated with each other.

(4) Protrusions (hereafter referred to as "positioning units") for determining the positions of the shield grounds 310B and 311B in the vertical direction are formed on the inner wall face of the housing 210B so that the distance L between the upper end face of the first conductive member 310Ba of the shield ground 310B and the lower face side of the cover glass 280A and the distance L between the upper end face of the second conductive member 311Ba of the shield ground 311B and the lower face side of the cover glass 280A are each larger than 0 (zero) and equal to or less than 0.3 mm.

(5) The tip end portion of the third conductive member 310Bb of the shield ground 310B is overlapped with one end portion of the insert sheet metal 220 (fifth conductive member), and the tip end portion of the fourth conductive member 311Bb of the shield ground 311B is overlapped with the other end portion of the insert sheet metal 220. The respective overlapped portions are secured with conductive screws 501, whereby the third conductive member 310Bb and the fourth conductive member 311Bb are electrically connected to each other.

The space between the upper end part 210Ba of the housing 210B and the cover glass 280A and the scattering preventing film 290 is filled with a thermosetting adhesive 502 so that these are bonded firmly.

The shield grounds 310B and 311B can be functioned as shield grounds by setting the distance L between the upper end face of each of the shield grounds 310B and 311B and the lower face side of the cover glass 280A to be larger than 0 (zero) and equal to or less than 0.3 mm. If the distance L is 0, the shield grounds 310B and 311B make contact with the cover glass 280A, and the cover glass 280A may be broken; hence, it is necessary to make the distance larger than 0. When the distance L is 0.3 mm, the distance becomes equal to the thickness of the touch panel unit 270.

The strength of the housing 210B is improved by securing the third conductive member 310Bb of the shield ground 310B and the fourth conductive member 311Bb of the shield ground 311B to the insert sheet metal 220. In this case, since the cover glass 280A and the scattering preventing film 290A are combined using the thermosetting adhesive 502 at the upper end part 210Ba of the housing 210B, the strength of the housing 210B is improved significantly. Hence, even if the housing 210B is gripped strongly, the housing 210E is not bent and erroneous coordinate signals are not output from the touch panel unit 270. In other words, even if the shield grounds 310B and 311B are not structured so as to move together with the touch panel unit 270, the performance of the touch panel as a touch panel can be ensured.

As describe above, since the portable electronic apparatus 500 according to Embodiment 4 has the shield grounds 310B and 311B, the influence of the holding hand on the portable electronic apparatus 500 (that is, malfunction caused by the reaction of the touch panel unit 270) can be suppressed.

Furthermore, since the upper end part 210Ba of the housing 210B and the cover glass 280A and the scattering preventing film 290A are combined using the thermosetting adhesive 502, the shield grounds 310B and 311B are secured to the insert sheet metal 220, and the housing 210B has a structure strong against deformation, the housing 210B is not bent even if the main body of the apparatus is gripped strongly with a hand, whereby the performance of the touch panel as a touch panel can be ensured.

Also in the portable electronic apparatus 500, the shield grounds 310B and 311B disposed around the end parts of the touch panel unit 270 absorb the leakage of the electric lines of force at the end parts, thereby suppressing the leakage of the electric lines of force from the end parts of the portable electronic apparatus 500. Hence, in the case that the portable electronic apparatus 500 is merely gripped, the portable electronic apparatus 500 can suppress the judgment that the apparatus is operated, whereby the operation mode can be efficiently shifted to the power-saving mode and the operable time of the battery can be made long.

Although the present invention has been described in detail and with reference to specific embodiments, it will be apparent to those skilled in the art that various alterations and modifications can be made without departing from the spirit and scope of the present invention.

This application is based upon Japanese Patent Application (No. 2012-095879) filed on Apr. 19, 2012, Japanese Patent Application (No. 2012-202988) filed on Sep. 14, 2012, and Japanese Patent Application (No. 2013-012483) filed on Jan. 25, 2013, the contents of which are incorporated herein by reference.

INDUSTRIAL APPLICABILITY

The portable electronic apparatus according to the present invention, equipped with an electrostatic capacitance type touch panel, has advantages such that erroneous coordinate signals are not output from the touch panel even if the shield grounds are moved together with the housing at the time when the main body of the apparatus is gripped with a hand and that the performance of the touch panel as a touch panel can be ensured, whereby the present invention is applicable to a portable electronic apparatus, such as a smart phone, equipped with an electrostatic capacitance type touch panel.

DESCRIPTION OF REFERENCE NUMERALS AND SIGNS 1 portable electronic apparatus
2 housing
3 receiver
4 liquid crystal display unit
5 touch panel unit
5-1 reception sensor panel
5-1a reception electrode
5-1b transmission electrode
5-2 reception sensor panel
5-2c transmission electrode
6 touch panel module
7 touch panel unit
7-1 to 7-3 function buttons
8 touch panel controller
9 apparatus control unit
20 cover panel
21 backlight unit
22 battery unit
30 display
150 portable electronic apparatus
151 apparatus control unit
152, 153 shield grounds
154, 155 variable resistors
160 coordinate processing unit
161 display processing unit
162 holding hand detection unit
170 first side
171 second side
175 circuit board
771 proximity touch panel sensor
772 cover glass
773 thickener
774 scattering preventing film
200, 350 portable electronic apparatuses
210 housing
211 first face
212 first side face
213 second side face
214 second face
215 concave part
220 insert sheet metal
230, 231 conductive cushions
240 touch panel controller
250 backlight
260 liquid crystal display unit
270 touch panel unit
280 cover glass
290 scattering preventing film
300 thickener
310, 311 shield grounds
310a first conductive member
310b third conductive member
310c fifth conductive member
311a second conductive member
311b fourth conductive member 311c sixth conductive member
310A, 311A shield grounds
310Aa first conductive member
311Aa second conductive member
310Ab third conductive member
311Ab fourth conductive member
400 portable electronic apparatus
401 eighth conductive member
210A housing
210Aa, 210Ab support units
211A first face
212A first side face
213A second side face
215A concave part
450 portable electronic apparatus
210B housing
210Ba upper end part
210Bb positioning unit
210Bc positioning unit
211B first face
212B first side face
213B second side face
215B concave part
280A cover glass
290A scattering preventing film
300A thickener
310B shield ground
310Ba first conductive member
310Bb third conductive member
311B shield ground
311Ba second conductive member
311Bb fourth conductive member
500 portable electronic apparatus
501 screw
502 thermosetting adhesive

What is claimed is:

1. A portable electronic apparatus comprising:
a housing having a first face and first and second side faces, wherein the first and second side faces rise from the first face, and at least a concave portion is configured by the first side face, the first face and the second side face;
a display, at least a part of the display being accommodated in the concave portion;
a touch panel that is positioned on the display and is capable of detecting at least a distance to an indicator;
first and second sheet metal members respectively disposed on the first and second side faces, at least a part of the first and second sheet metal members facing a side face of the display;
a third sheet metal member disposed on the first face; and
a cover glass that covers at least the display, the first sheet metal member, and the second sheet metal member,
wherein at least the display, the touch panel, and the cover glass are disposed in this order to comprise a stacked structure;
wherein the first and second sheet metal members are spaced from the display;
wherein the third sheet metal member is spaced from the display;
wherein a distance between an upper end face of the first sheet metal member and a lower face of the cover glass and a distance between an upper end face of the second sheet metal member and the lower face of the cover glass are each larger than zero and equal to or smaller than a predetermined value;
wherein the housing has at least a second face that is substantially parallel with the first face and is positioned on the opposite side of the concave portion with respect to the first face;
wherein a battery can be installed between the first face and the second face;
wherein the cover glass is adhered to an upper end portion of the first side face and an upper end portion of the second side face with adhesive;
wherein the first sheet metal member is secured to one end portion of the third sheet metal member with a screw;
wherein the second sheet metal member is secured to an other end portion of the third sheet metal member with a screw.

2. The portable electronic apparatus according to claim 1, wherein at least one of the first side face and the second side face of the housing has a positioner that positions the at least one of the first sheet metal member and the second sheet metal member at least in a vertical direction.

3. The portable electronic apparatus according to claim 2, wherein the positioner comprises a protrusion provided on the at least one of the first side face and the second side face of the housing.

4. The portable electronic apparatus according to claim 1, wherein at least the first side face, the second face, and the second side face is grippable by a hand of the user.

* * * * *